(12) United States Patent
Saitoh et al.

(10) Patent No.: US 10,072,544 B2
(45) Date of Patent: Sep. 11, 2018

(54) DETERIORATION DIAGNOSIS APPARATUS FOR THE EXHAUST GAS PURIFICATION APPARATUS

(71) Applicant: TOYOTA JIDOSHA KABUSHIKI KAISHA, Toyota-shi, Aichi-ken (JP)

(72) Inventors: Hirotaka Saitoh, Shizuoka-ken (JP); Koji Hagiwara, Susono (JP); Takahiko Fujiwara, Shizuoka-ken (JP); Toru Kidokoro, Hadano (JP); Yasushi Iwazaki, Ebina (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/976,585

(22) Filed: Dec. 21, 2015

(65) Prior Publication Data

US 2016/0186628 A1 Jun. 30, 2016

(30) Foreign Application Priority Data

Dec. 26, 2014 (JP) .................................. 2014-265364

(51) Int. Cl.
*F01N 3/00* (2006.01)
*F01N 3/08* (2006.01)
(Continued)

(52) U.S. Cl.
CPC ......... *F01N 3/0842* (2013.01); *F01N 3/0814* (2013.01); *F01N 3/0864* (2013.01); *F01N 3/0871* (2013.01); *F01N 3/208* (2013.01); *F01N 3/2066* (2013.01); *F01N 3/2073* (2013.01); *F01N 11/007* (2013.01); *F02D 35/0015* (2013.01); *F02D 41/0235* (2013.01); *F02D 41/0295* (2013.01); *F02D 41/1441* (2013.01); *F02D 41/1456* (2013.01); *F01N 13/009* (2014.06); *F01N 2550/02* (2013.01); *F01N 2900/0416* (2013.01); *F01N 2900/1402* (2013.01); *F01N 2900/1622* (2013.01); *F01N 2900/1624* (2013.01); *F02D 41/027* (2013.01); *F02D 41/0275* (2013.01);
(Continued)

(58) Field of Classification Search
None
See application file for complete search history.

(56) References Cited

U.S. PATENT DOCUMENTS

| 5,414,996 A | 5/1995 | Sawada et al. |
| 6,470,674 B1 | 10/2002 | Yamaguchi et al. |

(Continued)

FOREIGN PATENT DOCUMENTS

| JP | H05-133264 A | 5/1993 |
| JP | 2003-097334 A | 4/2003 |

(Continued)

*Primary Examiner* — Mark Laurenzi
*Assistant Examiner* — Jason Sheppard
(74) *Attorney, Agent, or Firm* — Hunton Andrews Kurth LLP

(57) ABSTRACT

Deterioration of a selective catalytic reduction (SCR) catalyst can be diagnosed with sufficient accuracy, by making use of a sensor for measuring an air fuel ratio of exhaust gas flowing into an exhaust gas purification apparatus, which is equipped with the SCR catalyst, and a sensor for measuring an air fuel ratio of exhaust gas flowing out from the exhaust gas purification apparatus.

10 Claims, 12 Drawing Sheets

(51) Int. Cl.
    *F01N 3/20*           (2006.01)
    *F01N 11/00*         (2006.01)
    *F02D 35/00*         (2006.01)
    *F02D 41/02*         (2006.01)
    *F02D 41/14*         (2006.01)
    *F01N 13/00*         (2010.01)
    *F02D 41/40*         (2006.01)

(52) U.S. Cl.
    CPC .... *F02D 41/405* (2013.01); *F02D 2200/0816* (2013.01); *Y02T 10/22* (2013.01); *Y02T 10/24* (2013.01); *Y02T 10/47* (2013.01)

(56) References Cited

U.S. PATENT DOCUMENTS

| | | | |
|---|---|---|---|
| 7,640,730 B2 * | 1/2010 | Gandhi | B01D 53/8631 |
| | | | 422/169 |
| 8,356,470 B2 * | 1/2013 | Nagaoka | B01D 53/9459 |
| | | | 60/286 |
| 8,800,274 B2 | 8/2014 | Sun et al. | |
| 9,068,491 B2 * | 6/2015 | Cavataio | F01N 3/101 |
| 2003/0017603 A1 | 1/2003 | Uchida et al. | |
| 2013/0311065 A1 | 11/2013 | Sun et al. | |
| 2014/0144125 A1 | 5/2014 | Cavataio et al. | |

FOREIGN PATENT DOCUMENTS

| | | |
|---|---|---|
| JP | 2005-098207 A | 4/2005 |
| JP | 2012-241652 A | 12/2012 |
| JP | 5534020 B2 | 6/2014 |
| JP | 2016-008510 A | 1/2016 |
| WO | 2015/194155 A1 | 12/2015 |

\* cited by examiner

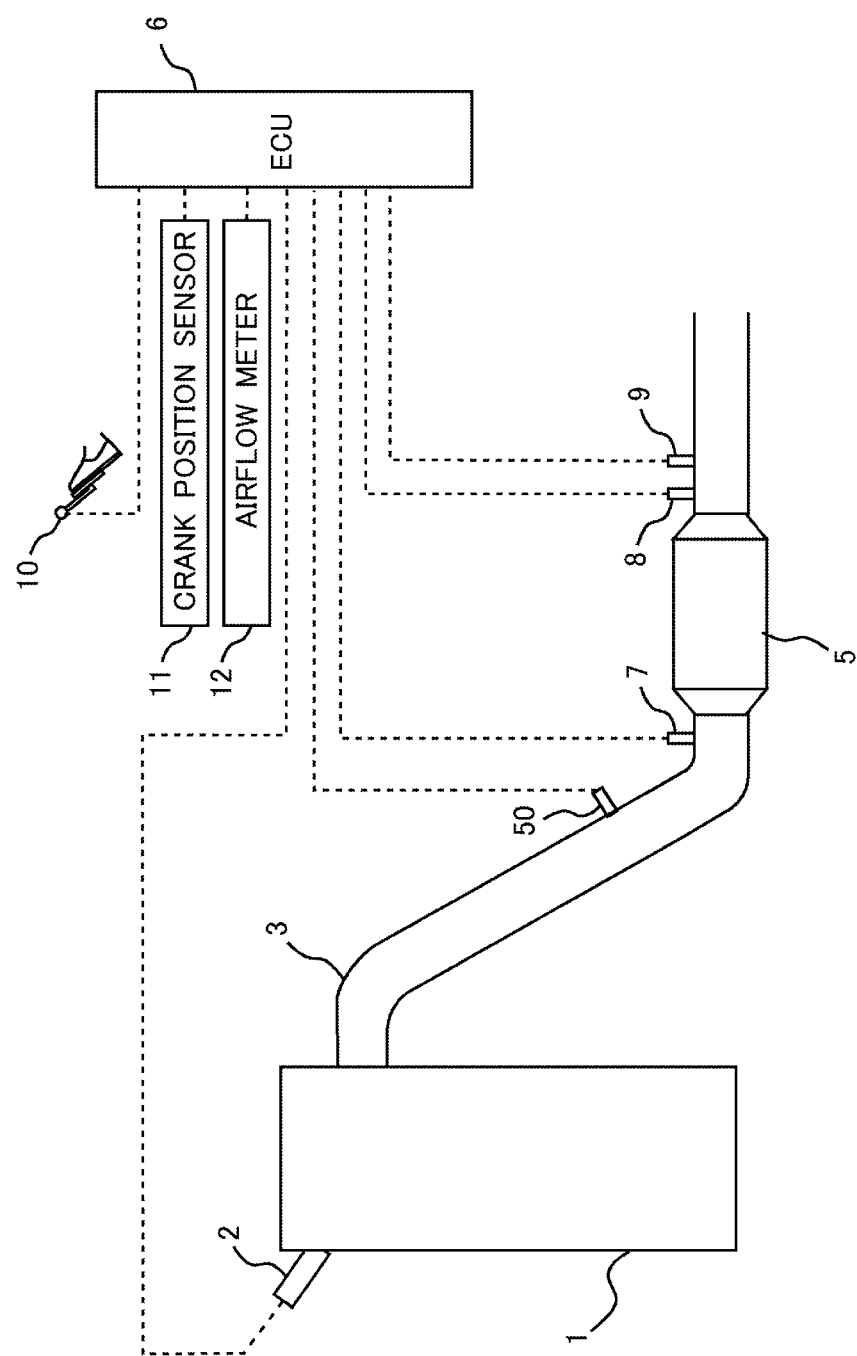
[FIG. 1]

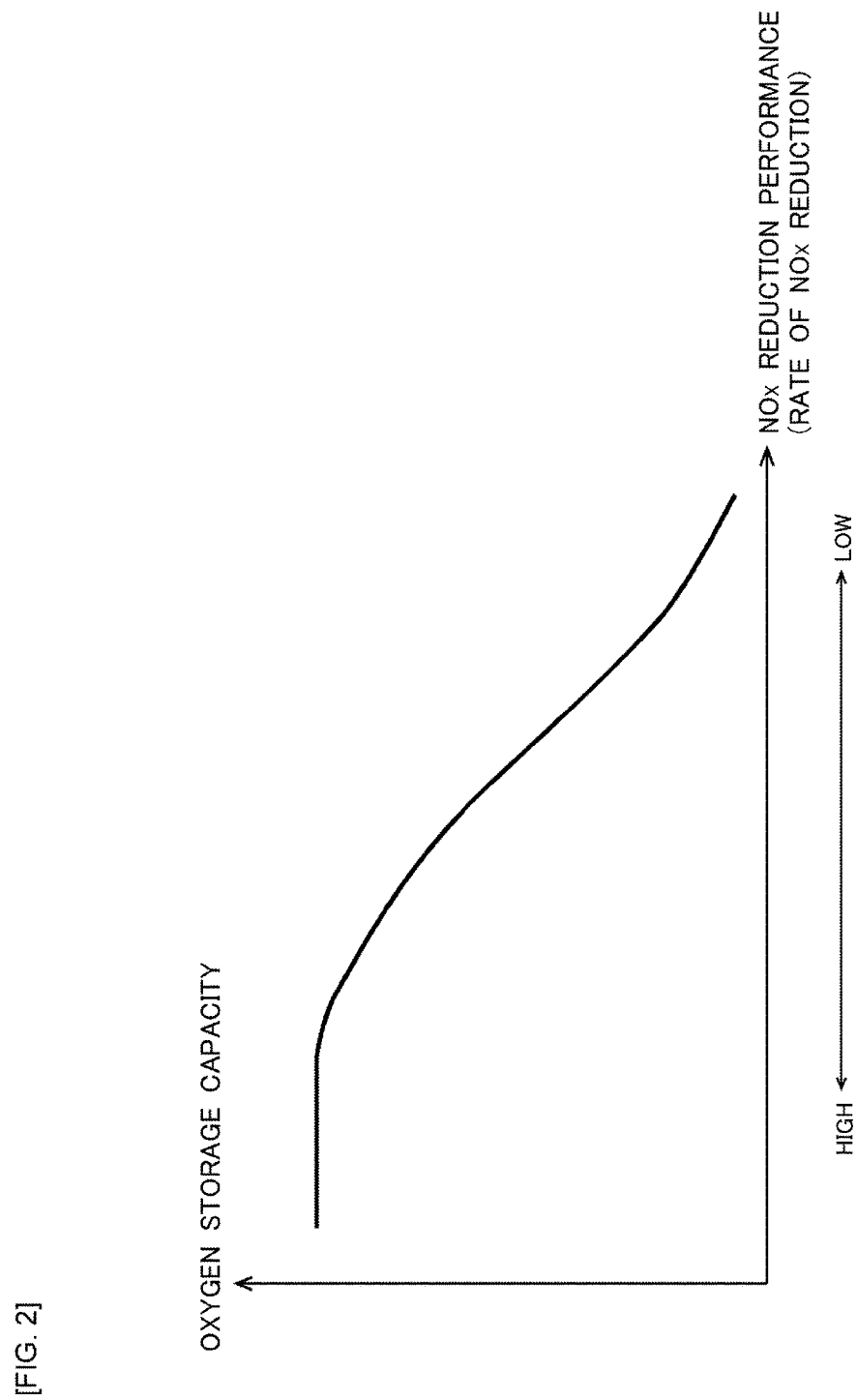
[FIG. 2]

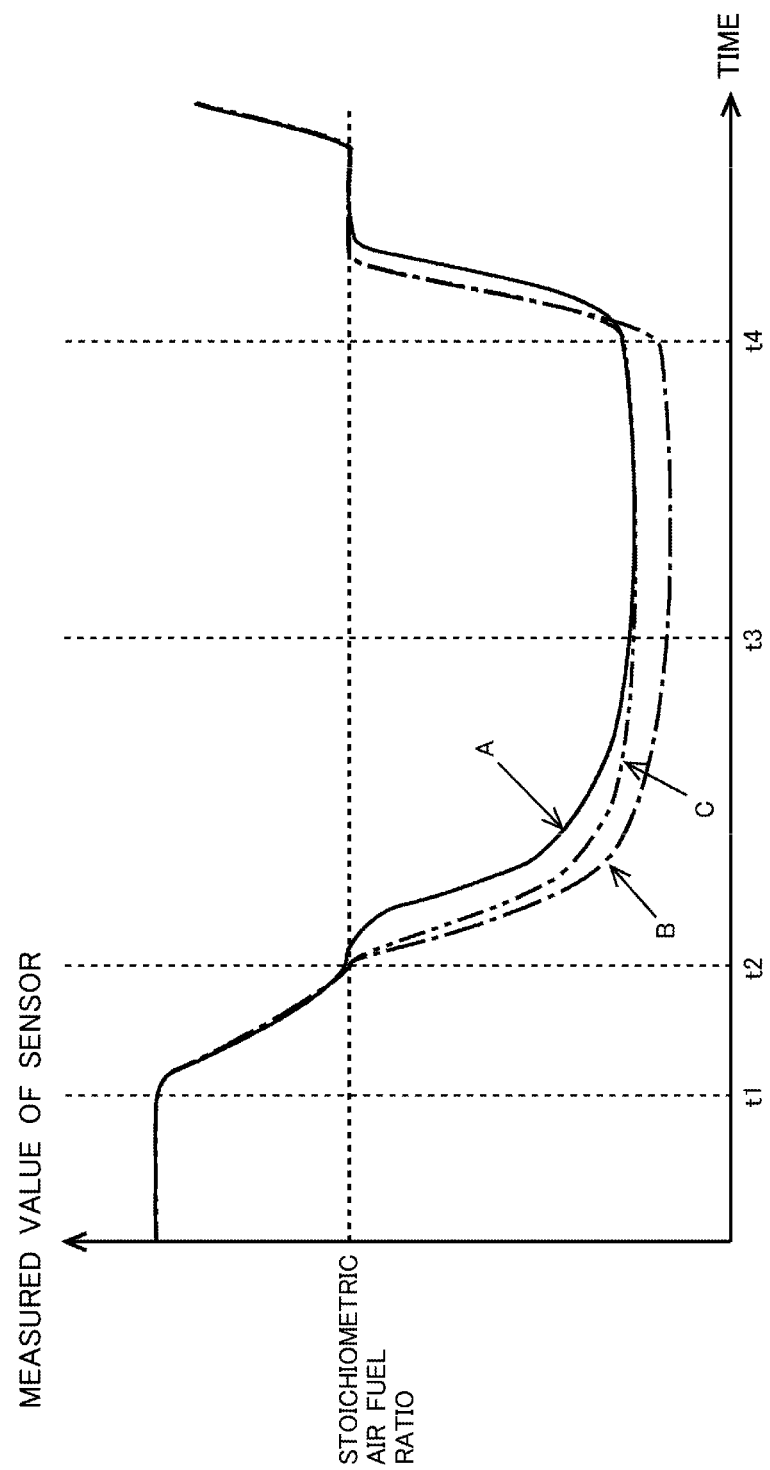
[FIG. 3]

[Fig. 4]
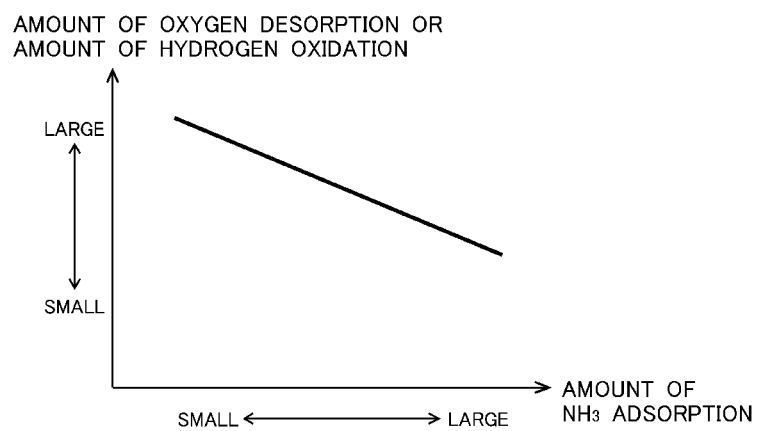

[Fig. 5]
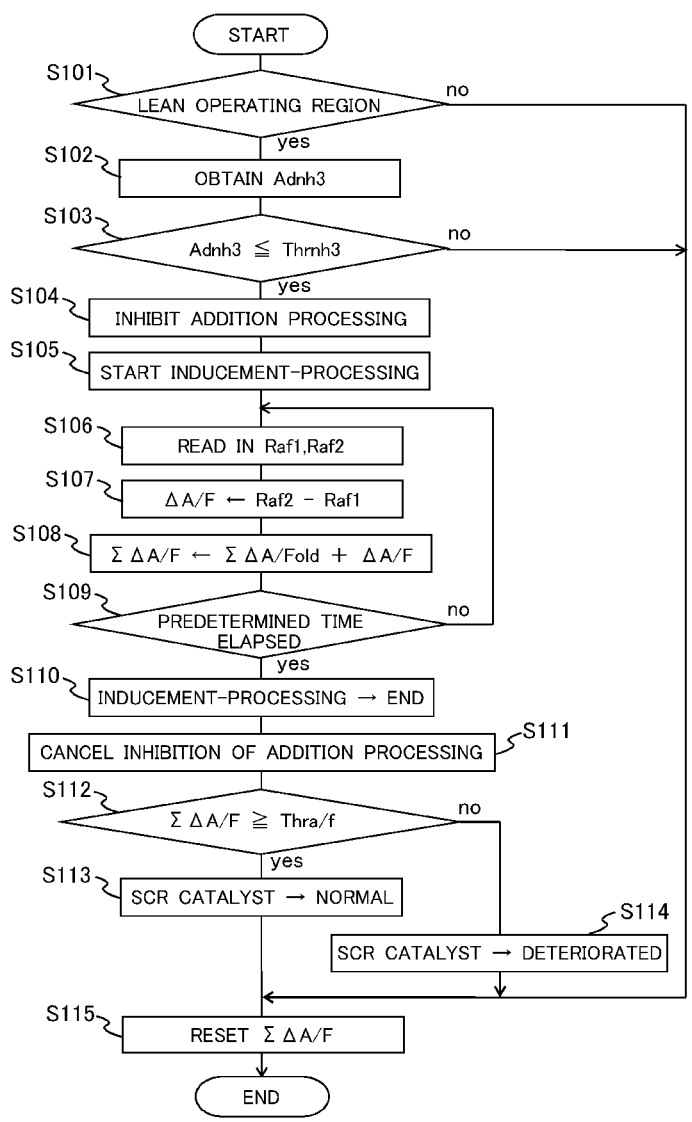

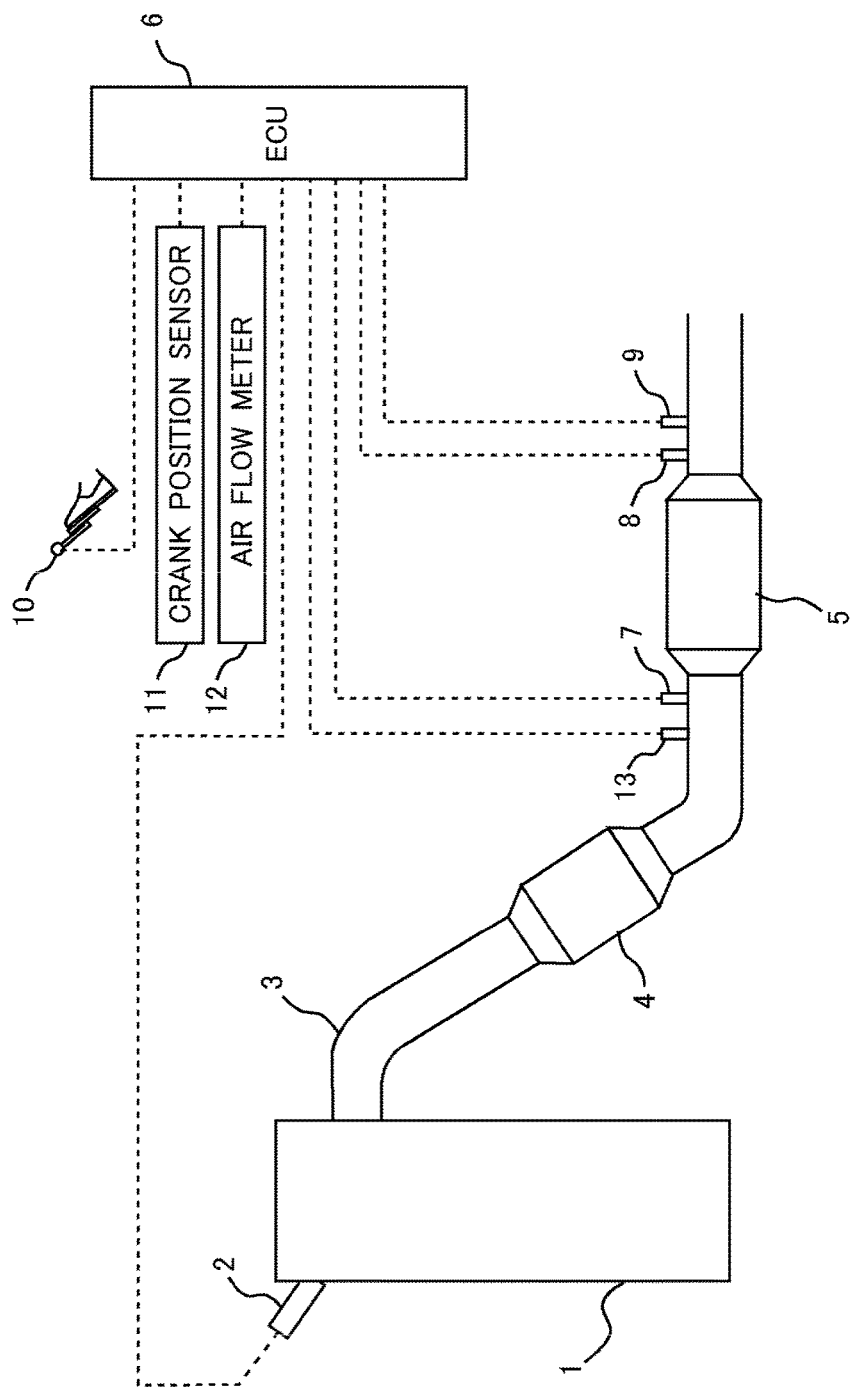
[FIG. 6]

[Fig. 7]
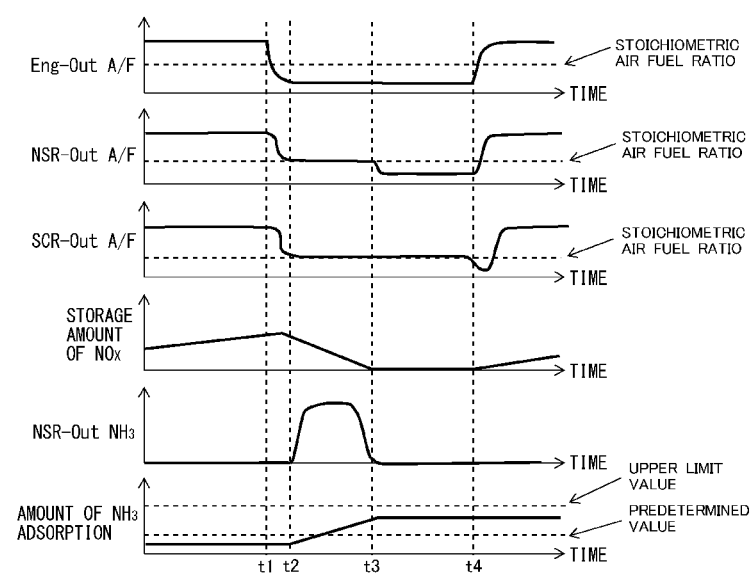

[Fig. 8]
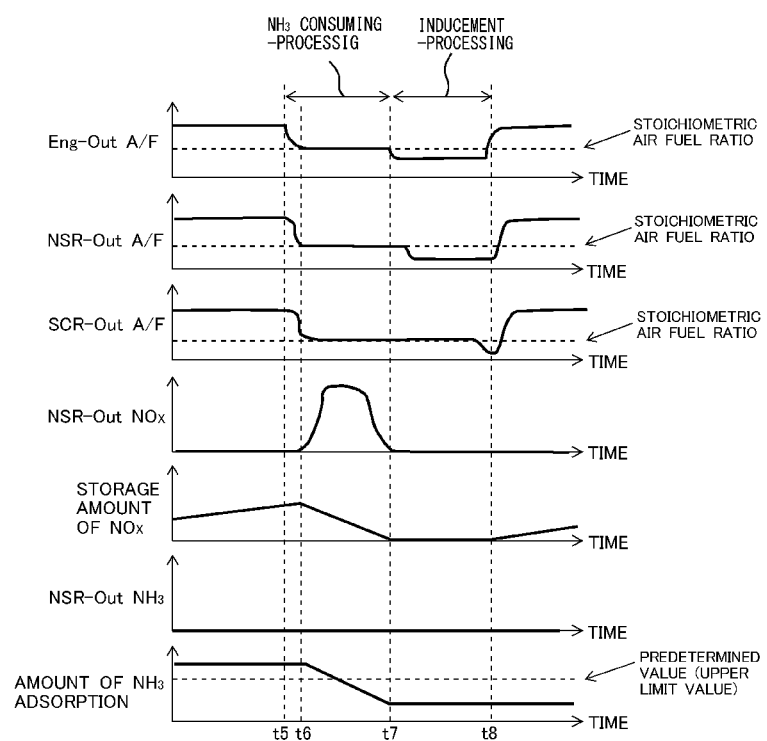

[Fig. 9]
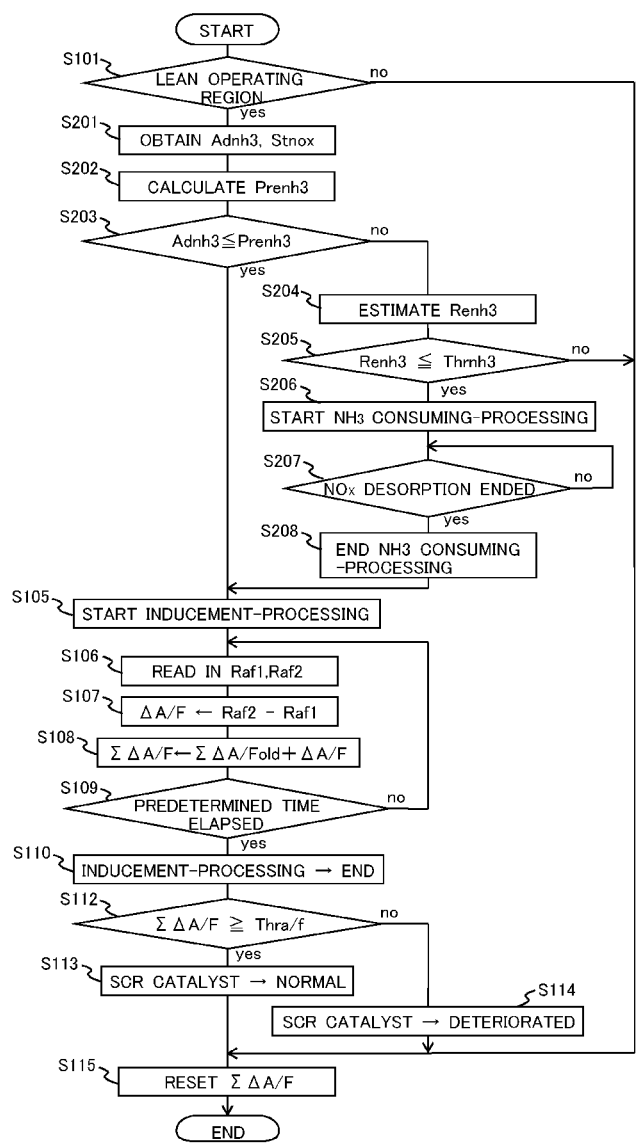

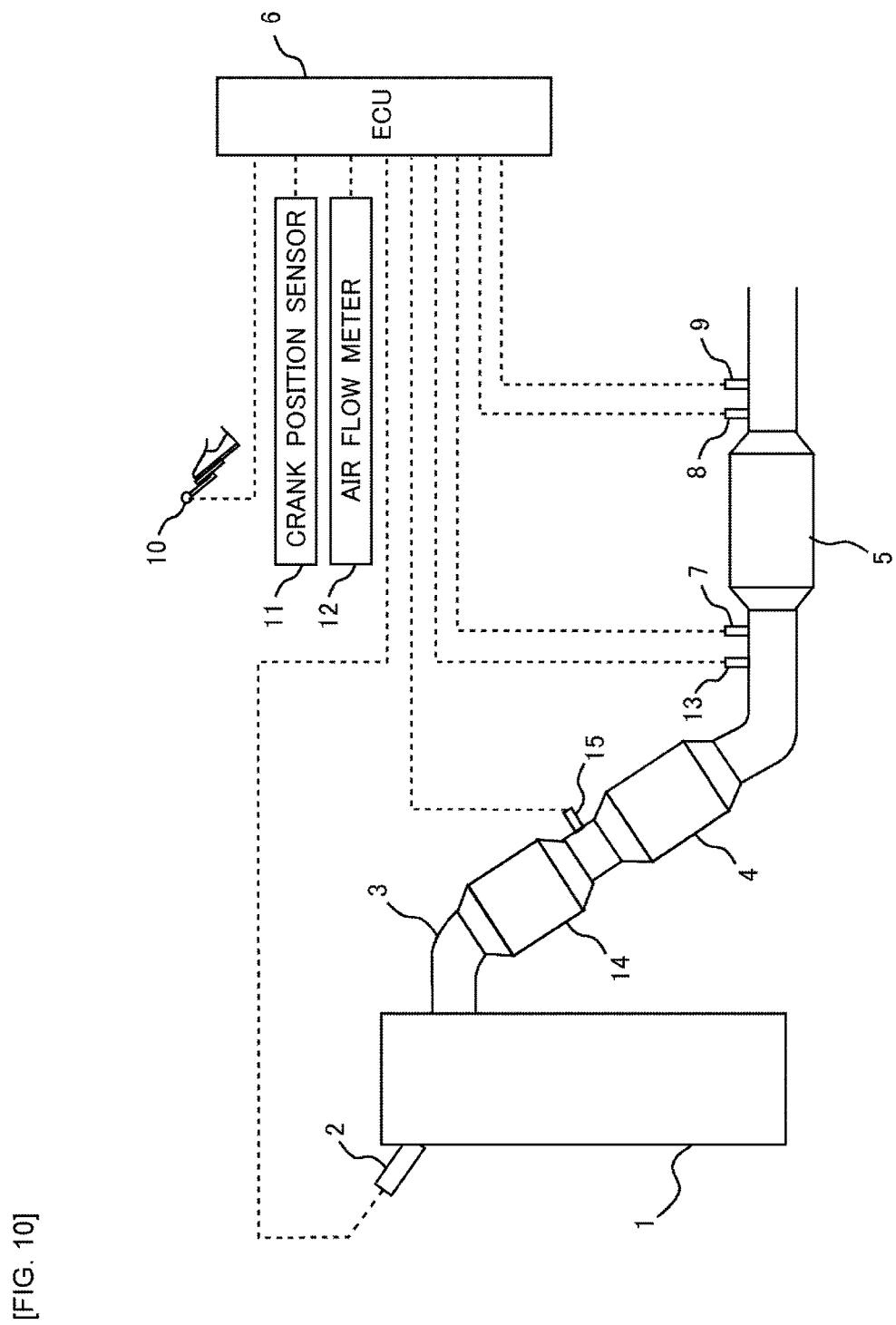
[FIG. 10]

[Fig. 11]
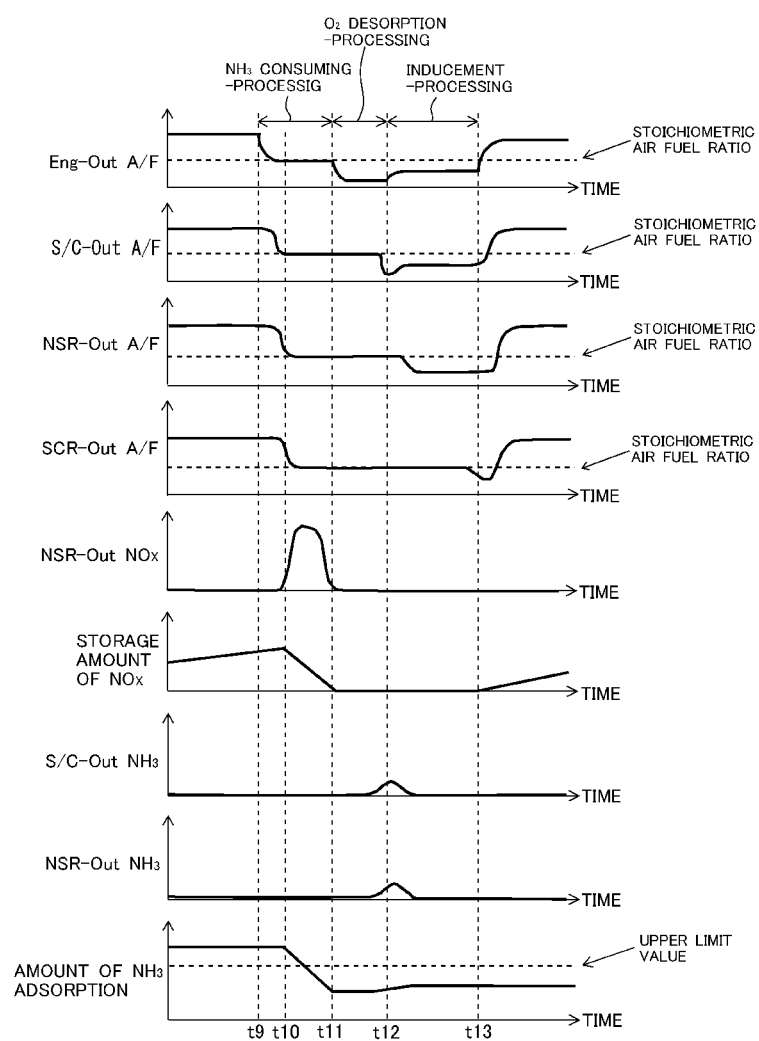

[Fig. 12]
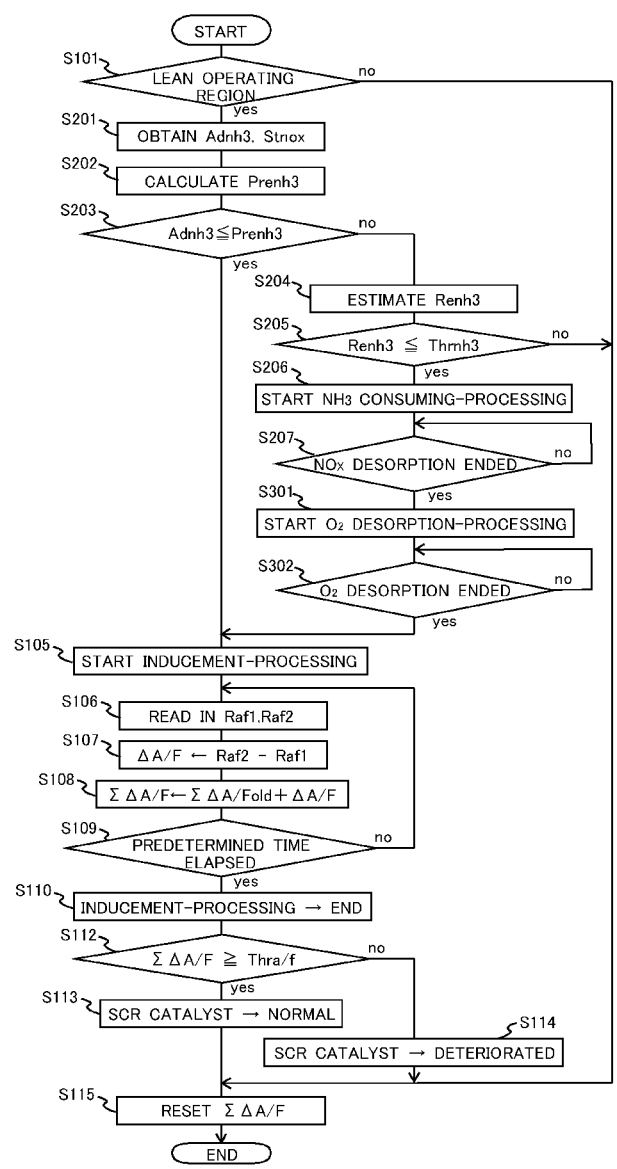

DETERIORATION DIAGNOSIS APPARATUS FOR THE EXHAUST GAS PURIFICATION APPARATUS

BACKGROUND OF THE INVENTION

Field of the Invention

The present invention relates to a technology for diagnosing a deterioration of an exhaust gas purification apparatus disposed in an exhaust passage of an internal combustion engine, and in particular to a technology for diagnosing the deterioration of the exhaust gas purification apparatus equipped with a selective catalytic reduction (SCR) catalyst.

Description of the Related Art

As a method of diagnosing a deterioration of an exhaust gas purification apparatus disposed in an exhaust passage of an internal combustion engine, there has been known a method of using measured values of air fuel ratio sensors (or oxygen concentration sensors) which are disposed in a portion of the exhaust passage at the upstream side of the exhaust gas purification apparatus and in a portion of the exhaust passage at the downstream side of the exhaust gas purification device, respectively. Specifically, there has been known the technology in which an amount of oxygen ($O_2$), which can be stored by the exhaust gas purification apparatus (hereinafter, referred to as an "oxygen storage capacity"), is obtained from a difference between outputs of the above-mentioned sensors disposed at two locations (hereinafter, referred to as a "sensor output difference") at the time of changing the air fuel ratio of the exhaust gas flowing into the exhaust gas purification apparatus from a lean air fuel ratio higher than a stoichiometric air fuel ratio into a rich air fuel ratio lower than the stoichiometric air fuel ratio, and the deterioration of the exhaust gas purification apparatus is diagnosed based on the oxygen storage capacity thus obtained (see, for example, a first patent literature). In addition, in a second patent literature, there is disclosed a technology in which in an arrangement in which an NOx storage reduction (NSR) catalyst and an SCR catalyst are disposed in an exhaust passage of an internal combustion engine, the larger the degree of deterioration of the SCR catalyst, the lower the air fuel ratio of exhaust gas at the time of the execution of rich spike processing is made.

CITATION LIST

Patent Literature

First Patent Literature: Japanese patent laid-open publication No. 2012-241652
Second Patent Literature: Japanese patent No. 5534020

SUMMARY OF THE INVENTION

Although the above-mentioned conventional technologies are aimed at an exhaust gas purification apparatus equipped with a three-way catalyst, but an SCR catalyst also has an oxygen storage ability, similar to the three-way catalyst, so it can be considered that deterioration of the SCR catalyst is diagnosed by the same method as in the above-mentioned conventional technologies. However, the oxygen storage capacity of the SCR catalyst is smaller than the oxygen storage capacity of the three-way catalyst, and hence, even in cases where the SCR catalyst is in a normal state where it has not deteriorated, a sensor output difference becomes small. For that reason, when an error is included in a measured value of at least one of the sensors for measuring the air fuel ratio of exhaust gas, the oxygen storage capacity of the SCR catalyst can not be obtained in an accurate manner from the sensor output difference, so that diagnostic accuracy may drop.

On the other hand, a method is considered in which a water gas shift reaction of carbon monoxide (CO) and water ($H_2O$), which is generated at the time of combustion of an air fuel mixture, is caused to occur by changing the air fuel ratio of the mixture to be combusted or burned in an internal combustion engine from a lean air fuel ratio into a rich air fuel ratio, or a difference between a sensor output difference at the time of an SCR catalyst being normal and a sensor output difference at the time of the SCR catalyst having been deteriorated is made to enlarge by causing the water gas shift reaction of carbon monoxide and water to occur in a three-way catalyst or an NOx storage reduction (NSR) catalyst, which is disposed at the upstream side of the SCR catalyst.

However, when the water gas shift reaction has been caused to occur by the method as stated above, an amount of hydrogen ($H_2$) to be oxidized in the SCR catalyst and an amount of oxygen to desorb from the SCR catalyst may vary according to an amount of ammonia ($NH_3$) which has been adsorbed or stored in the SCR catalyst (hereinafter, referred to as an "amount of $NH_3$ adsorption"). For example, the amount of oxygen to desorb from the SCR catalyst, and the amount of hydrogen to be oxidized in the SCR catalyst become smaller in the case where the amount of $NH_3$ adsorption is large, in comparison with the case where it is small. For that reason, if a deterioration diagnosis by the above-mentioned method is carried out at the time when the amount of $NH_3$ adsorption is relatively large, the sensor output difference will become small even in the case of the SCR catalyst being normal, so an erroneous diagnosis may be made that the SCR catalyst has deteriorated.

The present invention has been made in view of the actual circumstances as referred to above, and the object of the present invention is to provide a technology in which deterioration of an SCR catalyst can be diagnosed with sufficient accuracy by making use of a sensor for measuring an air fuel ratio of exhaust gas flowing into an exhaust gas purification apparatus equipped with an SCR catalyst, and a sensor for measuring an air fuel ratio of exhaust gas flowing out from the exhaust gas purification apparatus.

In order to solve the above-mentioned problems, the present invention resides in a deterioration diagnosis apparatus for an exhaust gas purification apparatus which is configured as follows. When an air fuel ratio of a mixture to be combusted in an internal combustion engine is a lean air fuel ratio, inducement-processing is carried out in which the air fuel ratio of the mixture to be combusted in the internal combustion engine is changed from the lean air fuel ratio into a rich air fuel ratio and in which a water gas shift reaction of carbon monoxide and water generated at the time of the combustion of the mixture is caused to occur, and an air fuel ratio of exhaust gas flowing into an SCR catalyst and an air fuel ratio of exhaust gas flowing out from the SCR catalyst at the time of execution of the inducement-processing are measured by means of air fuel ratio sensors, respectively, so that deterioration of the SCR catalyst is diagnosed based on a difference between the measured values of these sensors, wherein when an amount of ammonia adsorbed to the SCR catalyst is equal to or less than a predetermined upper limit value, said indecement processing is carried out.

Specifically, a deterioration diagnosis device for an exhaust gas purification apparatus according to the present invention comprises: an exhaust gas purification apparatus that is equipped with an SCR catalyst arranged in an exhaust passage of an internal combustion engine, which can be driven in a lean burn operation, for reducing NOx in exhaust gas by using ammonia as a reducing agent, said SCR catalyst acting to store oxygen in exhaust gas when the air fuel ratio of the exhaust gas is a lean air fuel ratio higher than a stoichiometric air fuel ratio, but to desorb the oxygen thus stored when the fuel ratio of the exhaust gas is a rich air fuel ratio lower than the stoichiometric air fuel ratio; an obtaining unit configured to obtain an amount of $NH_3$ adsorption which is an amount of ammonia stored in said SCR catalyst; a first air fuel ratio sensor that measures a physical quantity correlated with an air fuel ratio of the exhaust gas flowing into said SCR catalyst; a second air fuel ratio sensor that measures a physical quantity correlated with an air fuel ratio of the exhaust gas flowing out from said SCR catalyst; a control unit configured to carry out inducement-processing which changes an air fuel ratio of a mixture to be combusted in the internal combustion engine from a lean air fuel ratio into a rich air fuel ratio, when the air fuel ratio of the mixture to be combusted in the internal combustion engine is a lean air fuel ratio and when the amount of $NH_3$ adsorption obtained by said obtaining unit is equal to or less than a predetermined upper limit value, said inducement-processing acting to induce a water gas shift reaction of carbon monoxide and water generated at the time of combustion of the mixture; and a diagnosis unit configured to diagnose deterioration of said SCR catalyst based on a difference between a measured value of said first air fuel ratio sensor and a measured value of said second air fuel ratio sensor at the time of execution of said inducement-processing.

When the air fuel ratio of the mixture to be combusted in the internal combustion engine is a lean air fuel ratio, the air fuel ratio of the exhaust gas flowing into the SCR catalyst of the exhaust gas purification apparatus becomes a lean air fuel ratio, so that the oxygen contained in the exhaust gas is occluded or stored in the SCR catalyst. When the inducement-processing is carried out in a state where the SCR catalyst has stored oxygen, the air fuel ratio of the exhaust gas flowing into the SCR catalyst changes from the lean air fuel ratio to a rich air fuel ratio, so that the oxygen stored in the SCR catalyst desorbs from the SCR catalyst. The oxygen desorbed from the SCR catalyst flows out from the SCR catalyst together with the exhaust gas. For that reason, the air fuel ratio of the exhaust gas flowing out from the SCR catalyst becomes higher than the air fuel ratio of the exhaust gas flowing into the SCR catalyst. As a result, there occurs a difference between the measured value of the first air fuel ratio sensor and the measured value of the second air fuel ratio sensor, resulting from the amount of the oxygen desorbed from the SCR catalyst.

In addition, when the inducement-processing is carried out, there occurs a water gas shift reaction between carbon monoxide and water generated at the time of combustion of the mixture of a rich air fuel ratio, thus producing carbon dioxide ($CO_2$) and hydrogen. The hydrogen produced in this manner arrives at the first air fuel ratio sensor, together with the exhaust gas. At that time, because the diffusion rate of the hydrogen is faster than that of any of the other exhaust gas components, the hydrogen precedently arrives at a sensor element of the first air fuel ratio sensor, thus putting the surrounding atmosphere of the sensor element into a rich atmosphere. As a result, the measured value of the first air fuel ratio sensor becomes lower than an actual air fuel ratio (rich shift). After that, when the hydrogen generated by said water gas shift reaction flows into the SCR catalyst, the hydrogen is oxidized by the SCR catalyst, so a rich shift of the second air fuel ratio sensor becomes smaller than that of the first air fuel ratio sensor. As a result, there also occurs a difference between the measured value of the first air fuel ratio sensor and the measured value of the second air fuel ratio sensor, resulting from the amount of the hydrogen oxidized by the SCR catalyst.

Accordingly, a difference resulting from the amount of the oxygen desorbed from the SCR catalyst, and a difference resulting from the amount of the hydrogen oxidized by the SCR catalyst are included in the difference between the measured value of the first air fuel ratio sensor and the measured value of the second air fuel ratio sensor at the time of execution of the inducement-processing (i.e., a sensor output difference).

Here, as the SCR catalyst deteriorates, the oxygen storage ability of the SCR catalyst also deteriorates accordingly, so that the oxygen storage capacity of the SCR catalyst becomes smaller. Accordingly, in the case where the SCR catalyst has deteriorated, the amount of oxygen to desorb from the SCR catalyst at the time of execution of inducement-processing becomes smaller, in comparison with the case where the SCR catalyst has not deteriorated. As a result, the sensor output difference becomes smaller.

Moreover, in the case where the SCR catalyst has deteriorated, the amount of the hydrogen oxidized by the SCR catalyst becomes smaller, in comparison with the case where the SCR catalyst has not deteriorated. For that reason, in cases where the SCR catalyst has deteriorated, the amount of the hydrogen arriving at the second air fuel ratio sensor at the time of execution of the inducement-processing becomes larger, in comparison with the case where the SCR catalyst has not deteriorated, so that the rich shift of the second air fuel ratio sensor accordingly becomes larger. As a result, the sensor output difference becomes smaller.

Accordingly, in the case where the SCR catalyst has not deteriorated, the sensor output difference becomes large due to the synergetic effect of the oxygen storage ability and the hydrogen oxidation ability of the SCR catalyst, but in contrast to this, in the case where the SCR catalyst has deteriorated, the sensor output difference becomes small due to the synergetic effect of a decrease in the oxygen storage ability and a decrease in the hydrogen oxidation ability of the SCR catalyst. For that reason, the sensor output difference at the time of execution of the inducement-processing will differ to a large extent between in the case where the SCR catalyst has deteriorated and in the case where the SCR catalyst has not deteriorated.

When a remarkable difference occurs in the sensor output difference between the case where the SCR catalyst has not deteriorated and the case where the SCR catalyst has deteriorated, even in cases where an error is included in the measured value of the first air fuel ratio sensor and/or the measured value of the second air fuel ratio sensor, the influence of the error becomes small, and hence, it becomes possible to carry out deterioration diagnosis of the SCR catalyst with sufficient accuracy. In addition, because existing sensors such as air fuel ratio sensors, oxygen concentration sensors, or the like can be used as the first air fuel ratio sensor and the second air fuel ratio sensor, the cost for the deterioration diagnosis apparatus can also be decreased, in comparison with the case where NOx sensors, $NH_3$ sensors, etc., are used.

However, the amount of ammonia stored in the SCR catalyst (the amount of $NH_3$ adsorption) at the time of execution of the inducement-processing may vary each time the inducement-processing is carried out. When the amount of $NH_3$ adsorption at the time of execution of the inducement-processing varies, the amount of oxygen to desorb from the SCR catalyst and the amount of hydrogen to be oxidized in the SCR catalyst at the time of execution of the inducement-processing also vary, so that the sensor output difference also shows variation accordingly. When the variation in the sensor output difference resulting from the variation in the amount of $NH_3$ adsorption as referred to above occurs, there is a possibility that the difference in the sensor output difference between the case where the SCR catalyst has not deteriorated and the case where the SCR catalyst is in a deteriorated state may become small. In that case, there is a fear that it may become difficult to diagnose the deterioration state of the SCR catalyst in an accurate manner.

On the other hand, the control unit of the present invention is made to carry out the inducement-processing, when the air fuel ratio of the mixture to be combusted in the internal combustion engine is a lean air fuel ratio, and when the amount of $NH_3$ adsorption in the SCR catalyst is equal to or less than the predetermined upper limit value. The "predetermined upper limit value" referred to herein is a value at which it is considered that when the amount of $NH_3$ adsorption in the SCR catalyst is equal to or less than said upper limit value, a remarkable difference occurs between the sensor output difference in the case where the SCR catalyst has not deteriorated and the sensor output difference in the case where the SCR catalyst has deteriorated, and it is a value which is decided in consideration of the degree of deterioration of the SCR catalyst which should be detected by the deterioration diagnosis.

In this manner, if the inducement-processing is carried out when the amount of $NH_3$ adsorption in the SCR catalyst is equal to or less than said predetermined upper limit value, the difference in the sensor output difference between the case where the SCR catalyst has not deteriorated and the case where the SCR catalyst has deteriorated becomes larger, in comparison with the variation in the sensor output difference resulting from the variation in the amount of $NH_3$ adsorption, thus making it possible to diagnose the deterioration state of the SCR catalyst in an accurate manner.

Here, the exhaust gas purification apparatus may further be provided with an NSR catalyst that is disposed at the upstream side of the SCR catalyst, said NSR catalyst serving to store therein the NOx in the exhaust gas when the air fuel ratio of the exhaust gas is a lean air fuel ratio, but to desorb NOx therefrom when the air fuel ratio of the exhaust gas is equal to or less than the stoichiometric air fuel ratio. In such an arrangement, when inducement-processing is carried out, a water gas shift reaction is caused to occur at the time of combustion of the mixture of a rich air fuel ratio in the internal combustion engine, and besides, a water gas shift reaction is also caused to occur in the NSR catalyst, thus making it possible to more increase the amount of hydrogen generated at the time of execution of the inducement-processing. As a result, it is possible to make larger the difference between the sensor output difference in the case where the SCR catalyst has not deteriorated and the sensor output difference in the case where the SCR catalyst has deteriorated.

However, when the air fuel ratio of the exhaust gas flowing into the exhaust gas purification apparatus changes from the lean air fuel ratio to the rich air fuel ratio in accordance with the execution of the inducement-processing, the NOx stored in the NSR catalyst when the air fuel ratio of the exhaust gas was the lean air fuel ratio may be desorbed from the NSR catalyst, and the NOx thus desorbed may be reduced in the NSR catalyst to produce ammonia. The ammonia thus produced arrives at the SCR catalyst together with the exhaust gas, so that it is adsorbed by the SCR catalyst. As a result, even if the amount of $NH_3$ adsorption at the time of starting the inducement-processing is equal to or less than said predetermined upper limit value, the amount of $NH_3$ adsorption may increase to more than said predetermined upper limit value in the course of the execution of the inducement-processing. Accordingly, it can be said that in the case where the NSR catalyst is disposed at the upstream side of the SCR catalyst, it is desirable to carry out the inducement-processing at the time when the amount of $NH_3$ adsorption is smaller, in comparison with the case where the NSR catalyst is not disposed in this manner.

Accordingly, in the arrangement in which the NSR catalyst is disposed at the upstream side of the SCR catalyst, it is desirable to carry out said inducement-processing, when the air fuel ratio of the mixture to be combusted in the internal combustion engine is a lean air fuel ratio, and when the amount of $NH_3$ adsorption obtained by said obtaining unit is equal to or less than a predetermined value which is smaller than said predetermined upper limit value. The "predetermined value" referred to herein is, for example, a value which is obtained by subtracting from said predetermined upper limit value an amount of $NH_3$ production which is an amount of ammonia produced in the NSR catalyst, in the case of assuming that the inducement-processing has been carried out. Here, note that the amount of $NH_3$ production correlates with an amount of NOx stored in the NSR catalyst (a storage amount of NOx), so that it can be obtained based on the storage amount of NOx in the NSR catalyst.

According to such a construction, inducement-processing will be carried out in cases where the amount of $NH_3$ adsorption does not exceed said predetermined upper limit value in the course of the execution of the inducement-processing. Therefore, it is possible to perform diagnosis processing, while avoiding the amount of $NH_3$ adsorption in the SCR catalyst from exceeding said predetermined upper limit value in the course of the execution of the inducement-processing. As a result, it is possible to suppress the reduction in accuracy of the diagnosis resulting from the ammonia produced in the NSR catalyst.

Here, note that when the air fuel ratio of the mixture to be combusted in the internal combustion engine is a lean air fuel ratio, and when the amount of $NH_3$ adsorption obtained by said obtaining unit is more than said predetermined value, the control unit may carry out $NH_3$-consuming-processing which is to change the air fuel ratio of the mixture to be combusted in the internal combustion engine from a lean air fuel ratio to the stoichiometric air fuel ratio, and which is to decrease the amount of $NH_3$ adsorption in the SCR catalyst to an amount equal to or less than said predetermined value, by causing the NOx stored in the NSR catalyst to desorb therefrom, and reducing the NOx thus desorbed from the NSR catalyst by means of the SCR catalyst, and then may carry out inducement-processing after the execution of the $NH_3$-consuming-processing. It is desirable to carry out the $NH_3$-consuming-processing referred to herein until the NOx stored in the NSR catalyst has been desorbed, but the $NH_3$-consuming-processing may be ended at the time when the storage amount of NOx in the NSR catalyst has decreased to an amount set in advance.

When the $NH_3$-consuming-processing is carried out before the execution of the inducement-processing, the amount of $NH_3$ adsorption in the SCR catalyst at the time of the execution of the inducement-processing can be decreased to an amount equal to or less than said predetermined value. In addition, the amount of NOx being desorbed from the NSR catalyst during the execution of the inducement-processing becomes smaller, so that it becomes difficult for the amount of $NH_3$ adsorption in the SCR catalyst to exceed said predetermined upper limit value in the course of the execution of the inducement-processing. Accordingly, even in the case where the amount of $NH_3$ adsorption in the SCR catalyst is larger than said predetermined value, the variation in the sensor output difference resulting from the variation in the amount of $NH_3$ adsorption can be suppressed to a small amount. As a result, it is possible to diagnose the deterioration state of the SCR catalyst in an accurate manner.

Here, note that in cases where the amount of NOx stored in the NSR catalyst (the storage amount of NOx) is small, or in cases where the amount of $NH_3$ adsorption in the SCR catalyst is large, there is a possibility that even when the above-mentioned $NH_3$-consuming-processing is carried out, the amount of $NH_3$ adsorption in the SCR catalyst can not be decreased to said predetermined value or below. Accordingly, the amount of $NH_3$ adsorption in the SCR catalyst (the amount of residual $NH_3$) at the end time point of said $NH_3$-consuming-processing in the case of assuming that the $NH_3$-consuming-processing is carried out may be estimated, and in cases where the amount of residual $NH_3$ becomes equal to or less than said predetermined value, the $NH_3$-consuming-processing may be carried out.

Specifically, the deterioration diagnosis apparatus for an exhaust gas purification apparatus according to the present invention may further be provided with: a calculation unit configured to calculate a storage amount of NOx which is an amount of NOx stored in the NSR catalyst; and an estimation unit configured to calculate an amount of $NH_3$ consumption which is an amount of ammonia to be consumed in the case of assuming that an amount of NOx corresponding to the storage amount of NOx calculated by said calculation unit is reduced by the SCR catalyst, and estimates an amount of residual $NH_3$ which is an amount of $NH_3$ adsorption in the SCR catalyst at the end time point of said $NH_3$-consuming-processing in the case of assuming that said $NH_3$-consuming-processing is carried out, by subtracting the amount of $NH_3$ consumption from the amount of $NH_3$ adsorption obtained by said obtaining unit. Then, when the air fuel ratio of the mixture to be combusted in the internal combustion engine is a lean air fuel ratio, and when the amount of $NH_3$ adsorption obtained by said obtaining unit is more than said predetermined value, the control unit may be configured to carry out said $NH_3$-consuming-processing, if the amount of residual $NH_3$ estimated by said estimation unit is equal to or less than said predetermined value. According to such a configuration, the amount of $NH_3$ adsorption in the SCR catalyst at the time of the execution of the inducement-processing can be suppressed to a value equal to or less than said predetermined upper limit value in a more reliable manner, thus making it possible to suppress the reduction in accuracy of the diagnosis resulting from the variation in the amount of $NH_3$ adsorption.

In addition, the exhaust gas purification apparatus may further be equipped with a three-way catalyst that is disposed at the upstream side of the NSR catalyst, for storing oxygen in the exhaust gas when the air fuel ratio of the exhaust gas is a lean air fuel ratio, and desorbing oxygen therefrom when the air fuel ratio of the exhaust gas is a rich air fuel ratio. In such an arrangement, by desorbing the oxygen stored in the three-way catalyst in advance before carrying out the inducement-processing, it is possible to make short the execution period of time of the inducement-processing. In order to desorb the oxygen stored in the three-way catalyst, it is necessary to make the air fuel ratio of the exhaust gas flowing into the three-way catalyst to be a rich air fuel ratio, by adjusting the air fuel ratio of the mixture to be combusted in the internal combustion engine to a rich air fuel ratio.

Here, when the processing to desorb the oxygen stored in the three-way catalyst ($O_2$-desorption-processing) is carried out before the execution of the above-mentioned $NH_3$-consuming-processing, the exhaust gas of a rich air fuel ratio may be discharged from the three-way catalyst at the time when the oxygen stored in the three-way catalyst has been fully desorbed. In that case, in the NSR catalyst disposed at the downstream side of the three-way catalyst, the NOx desorbed from the NSR catalyst may be reduced to produce ammonia. Because the ammonia produced in the NSR catalyst is adsorbed to the SCR catalyst disposed at the downstream side of the NSR catalyst, the amount of $NH_3$ adsorption in the SCR catalyst will increase. Accordingly, it is desirable to carry out said $O_2$-desorption-processing, after the execution of the $NH_3$-consuming-processing and before the execution of the inducement-processing. When the $O_2$-desorption-processing is carried out after the execution of the $NH_3$-consuming-processing, the amount of ammonia produced in the NSR catalyst becomes small, even if the exhaust gas of a rich air fuel ratio is discharged from the three-way catalyst at the time when the oxygen stored in the three-way catalyst has been fully desorbed, as a result of which a large increase in the amount of $NH_3$ adsorption can be suppressed.

According to the present invention, deterioration of an SCR catalyst can be diagnosed with sufficient accuracy, by making use of a sensor for measuring an air fuel ratio of exhaust gas flowing into an exhaust gas purification apparatus, which is equipped with the SCR catalyst, and a sensor for measuring an air fuel ratio of exhaust gas flowing out of the exhaust gas purification apparatus.

Further features of the present invention will become apparent from the following description of exemplary embodiments with reference to the attached drawings.

BRIEF DESCRIPTION OF THE DRAWINGS

FIG. 1 is a view showing the schematic construction of an exhaust system of an internal combustion engine to which the present invention is applied, in a first embodiment of the present invention.

FIG. 2 is a view showing the correlation between NOx reduction performance and a storage amount of oxygen in an SCR catalyst.

FIG. 3 is a view showing the changes over time of a measured value of a first air fuel ratio sensor and a measured value of a second air fuel ratio sensor in the case of changing the air fuel ratio of exhaust gas from a lean air fuel ratio into a rich air fuel ratio.

FIG. 4 is a view showing the relation between an amount of $NH_3$ adsorption and an amount of oxygen desorption or an amount of hydrogen oxidation (oxidized hydrogen) of the SCR catalyst.

FIG. 5 is a flow chart showing a processing routine which is executed by an ECU at the time of making a deterioration diagnosis of the SCR catalyst in the first embodiment of the present invention.

FIG. 6 is a view showing the schematic construction of an exhaust system of an internal combustion engine to which the present invention is applied, in a second embodiment of the present invention.

FIG. 7 is a timing chart showing the change over time of an amount of $NH_3$ adsorption in the case of carrying out inducement-processing, when an amount of $NH_3$ adsorption in an SCR catalyst is equal to or less than a predetermined value.

FIG. 8 is a timing chart showing the change over time of an amount of $NH_3$ adsorption in the case of carrying out $NH_3$-consuming-processing and inducement-processing in a sequential manner, when the amount of $NH_3$ adsorption in the SCR catalyst is more than a predetermined value.

FIG. 9 is a flow chart showing a processing routine which is executed by an ECU at the time of making a deterioration diagnosis of the SCR catalyst in the second embodiment of the present invention.

FIG. 10 is a view showing the schematic construction of an exhaust system of an internal combustion engine to which the present invention is applied, in a third embodiment of the present invention.

FIG. 11 is a timing chart showing the change over time of an amount of $NH_3$ adsorption in the case of carrying out $NH_3$-consuming-processing, $O_2$-desorption-processing, and inducement-processing in a sequential manner, when an amount of $NH_3$ adsorption in an SCR catalyst is more than a predetermined value.

FIG. 12 is a flow chart showing a processing routine which is executed by an ECU at the time of making a deterioration diagnosis of the SCR catalyst in the third embodiment of the present invention.

DESCRIPTION OF THE EMBODIMENTS

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

First, reference will be made to a first embodiment of the present invention based on FIGS. 1 through 5. FIG. 1 is a view showing the schematic construction of an exhaust system of an internal combustion engine, to which the present invention is applied. The internal combustion engine 1 shown in FIG. 1 is a spark ignition type internal combustion engine (gasoline engine) which is able to be operated (in lean burn operation) by combusting a mixture having a lean air fuel ratio higher than a stoichiometric air fuel ratio, but may instead be a compression ignition type internal combustion engine.

The internal combustion engine 1 is provided with fuel injection valves 2 for supplying fuel to individual cylinders, respectively. Each of the fuel injection valves 2 may be a valve mechanism which serves to inject fuel into an intake port of each corresponding cylinder, or may be a valve mechanism which serves to inject fuel into each corresponding cylinder.

An exhaust pipe 3 is connected to the internal combustion engine 1. The exhaust pipe 3 is a pipe having a passage through which a gas (exhaust gas) combusted or burned in the interior of each cylinder of the internal combustion engine 1 flows. A catalyst casing 5 is arranged in the middle of the exhaust pipe 3. The catalyst casing 5 receives an SCR catalyst. Specifically, the catalyst casing 5 receives a honeycomb structured body made of cordierite or Fe—Cr—Al based heat resisting steel, a zeolite based coat layer covering the honeycomb structured body, and a transition metal (copper (Cu), iron (Fe), etc.) supported by the coat layer. The SCR catalyst constructed in this manner serves to adsorb ammonia contained in the exhaust gas, and to reduce NOx in the exhaust gas by using the ammonia thus adsorbed. In addition, an addition device 50 for adding ammonia to the exhaust gas flowing through the interior of the exhaust pipe 3 is disposed in the exhaust pipe 3 at a location upstream of the catalyst casing 5. Here, note that a substance to be added from the addition device 50 may be ammonia gas, or may be a precursor of ammonia such as an aqueous urea solution.

In the internal combustion engine 1 constructed in this manner, there is arranged in combination therewith an ECU 6 for controlling the internal combustion engine 1. The ECU 6 is an electronic control unit which is composed of a CPU, a ROM, a RAM, a backup RAM, and so on. The ECU 6 is electrically connected to a variety of kinds of sensors such as a first air fuel ratio sensor 7, a second air fuel ratio sensor 8, an exhaust gas temperature sensor 9, an accelerator position sensor 10, a crank position sensor 11, an air flow meter 12, and so on.

The first air fuel ratio sensor 7 is mounted on the exhaust pipe 3 at a location upstream of the catalyst casing 5, and outputs an electric signal correlated with an air fuel ratio of the exhaust gas which flows into the catalyst casing 5. This first air fuel ratio sensor 7 corresponds to a first air fuel ratio sensor according to the present invention. Here, note that the air fuel ratio of the exhaust gas flowing into the catalyst casing 5 may be calculated from a measured value of an oxygen concentration sensor that is mounted instead of the first air fuel ratio sensor 7.

The second air fuel ratio sensor 8 is mounted on the exhaust passage 3 at a location downstream of the catalyst casing 5, and outputs an electric signal correlated with an air fuel ratio of the exhaust gas which flows out from the catalyst casing 5. This second air fuel ratio sensor 8 corresponds to a second air fuel ratio sensor according to the present invention. Here, note that the air fuel ratio of the exhaust gas flowing out from the catalyst casing 5 may be calculated from a measured value of an oxygen concentration sensor that is mounted instead of the second air fuel ratio sensor 8.

The exhaust gas temperature sensor 9 is mounted on the exhaust pipe 3 at a location downstream of the catalyst casing 5, and outputs an electrical signal correlated with a temperature of the exhaust gas flowing in the interior of the exhaust pipe 3. The accelerator position sensor 10 is mounted on an accelerator pedal (not shown), and outputs an electric signal correlated with an amount of operation of the accelerator pedal (i.e., a degree of accelerator opening). The crank position sensor 11 is mounted on the internal combustion engine 1, and outputs an electric signal correlated with a rotational position of an engine output shaft (crankshaft). The air flow meter 12 is mounted on an intake pipe (not shown) of the internal combustion engine 1, and outputs an electrical signal correlated with an amount (mass) of fresh air (i.e., air) flowing in the intake pipe.

The ECU 6 controls the operating state of the internal combustion engine 1 based on the output signals of the above-mentioned variety of kinds of sensors. For example, the ECU 6 calculates a target air fuel ratio of the mixture based on an engine load calculated from the output signal of the accelerator position sensor 10 (the accelerator opening degree) and an engine rotational speed calculated from the output signal of the crank position sensor 11. The ECU 6 calculates a target amount of fuel injection (a fuel injection period) based on the target air fuel ratio and the output signal of the air flow meter 12 (the amount of intake air), and operates the fuel injection valves 2 according to the target amount of fuel injection thus calculated. At that time, the ECU 6 sets the target air fuel ratio to a lean air fuel ratio which is higher than the stoichiometric air fuel ratio, in cases where the operating state of the internal combustion engine 1 is in a low rotation and low load region or in a middle rotation and middle load region. In addition, the ECU 6 sets the target air fuel ratio to the stoichiometric air fuel ratio or a rich air fuel ratio which is lower than the stoichiometric air fuel ratio, in cases where the operating state of the internal combustion engine 1 is in a high load region or a high rotation region. Thus, when the operating state of the internal combustion engine 1 belongs to the low rotation and low load region or the middle rotation and middle load region (hereinafter, these operating regions being referred to as a "lean operating region"), the target air fuel ratio is set to a lean air fuel ratio, so that the internal combustion engine 1 is operated in a lean burn state, thereby making it possible to suppress the amount of fuel consumption to a low level.

In addition, the ECU 6 calculates an amount of NOx discharged from the internal combustion engine 1 (an amount of NOx flowing into the SCR catalyst in the catalyst casing 5) based on the operating state of the internal combustion engine 1, and then calculates, based on the result of the calculation and the temperature of the SCR catalyst, an amount of ammonia which contributes to the reduction of NOx in the SCR catalyst. Moreover, the ECU 6 calculates an amount of ammonia stored in the SCR catalyst (an amount of $NH_3$ adsorption) by integrating a difference between an amount of ammonia to be added from the addition device 50, and the amount of ammonia which contributes to the reduction of NOx in the SCR catalyst. In this manner, by calculating the amount of $NH_3$ adsorption by means of the ECU 6, an "obtaining unit" according to the present invention is achieved. Then, the ECU 6 controls the amount of ammonia to be added from the above-mentioned addition device 50 based on the amount of $NH_3$ adsorption obtained in the above-mentioned manner. For example, the ECU 6 controls the amount of addition of ammonia in such a manner that the amount of NOx discharged from the internal combustion engine 1 does not become insufficient for the amount of $NH_3$ adsorption in the SCR catalyst, or controls the amount of addition of ammonia in such a manner that the amount of $NH_3$ adsorption in the SCR catalyst becomes a predetermined target amount of adsorption. Thus, when the amount of addition of ammonia is controlled in this manner, it is possible to reduce the NOx in the exhaust gas in an effective manner, even in cases where the internal combustion engine 1 is operated in the lean burn state.

However, when the SCR catalyst received in the catalyst casing 5 deteriorates, the NOx having not been fully reduced by the SCR catalyst may be discharged into the atmosphere. For that reason, in cases where the SCR catalyst has deteriorated, it is necessary to detect the deterioration of the SCR catalyst in a quick manner, so that the driver of a vehicle with the internal combustion engine 1 mounted thereon can be prompted to repair the SCR catalyst, or the lean burn operation of the internal combustion engine 1 can be inhibited.

Hereinafter, reference will be made to a method of diagnosing deterioration of the SCR catalyst received in the catalyst casing 5. In this embodiment, the deterioration of the SCR catalyst is diagnosed based on the oxygen storage ability of the SCR catalyst. The SCR catalyst stores the oxygen in the exhaust gas under the action of the transition metal which is equipped by the SCR catalyst, when the air fuel ratio of the exhaust gas is a lean air fuel ratio. Then, the oxygen stored in the SCR catalyst desorbs from the SCR catalyst, when the air fuel ratio of the exhaust gas changes from the lean air fuel ratio to a rich air fuel ratio. Such oxygen storage ability of the SCR catalyst is correlated with the NOx reduction performance of the SCR catalyst. FIG. 2 is a view showing the correlation between the NOx reduction performance of the SCR catalyst and the amount of oxygen able to be stored by the SCR catalyst (the oxygen storage capacity). As shown in FIG. 2, when the NOx reduction performance (the rate of NOx reduction) of the SCR catalyst is sufficiently high (e.g., when the rate of NOx reduction is 80%-100%), the oxygen storage capacity of the SCR catalyst also becomes sufficiently large, but when the NOx reduction performance of the SCR catalyst drops to some extent (i.e., the rate of NOx reduction drops to less than 80%), the oxygen storage capacity of the SCR catalyst also becomes accordingly small. As a result, by obtaining the oxygen storage capacity of the SCR catalyst, it can be determined whether the NOx reduction performance of the SCR catalyst has deteriorated. For example, when the oxygen storage capacity of the SCR catalyst is smaller than a reference value set in advance, a determination can be made that the NOx reduction performance of the SCR catalyst has deteriorated.

The oxygen storage capacity of the SCR catalyst is correlated with the amount of oxygen which desorbs from the SCR catalyst in the case where the air fuel ratio of the exhaust gas has been changed from a lean air fuel ratio to a rich air fuel ratio. The amount of oxygen to desorb from the SCR catalyst in the case where the air fuel ratio of the exhaust gas has been changed from a lean air fuel ratio to a rich air fuel ratio can be obtained based on a difference between an air fuel ratio (or oxygen concentration) of the exhaust gas flowing into the SCR catalyst and an air fuel ratio (or oxygen concentration) of the exhaust gas flowing out from the SCR catalyst.

For example, in a state where the air fuel ratio of the exhaust gas has been changed from a lean air fuel ratio to a rich air fuel ratio, a difference between the measured value of the first air fuel ratio sensor 7 and the measured value of the second air fuel ratio sensor 8 is obtained, and by substituting the difference thus obtained into the following expression (1), an amount of oxygen Aox desorbed from the SCR catalyst can be obtained each time.

$$Aox = \Delta A/F * \alpha * Qinj \quad (1)$$

In the above-mentioned expression (1), $\Delta A/F$ is a value which is obtained by subtracting the measured value of the first air fuel ratio sensor 7 from the measured value of the second air fuel ratio sensor 8; $\alpha$ is a mass ratio of the oxygen contained in the air; and Qinj is an amount of fuel injection.

Subsequently, a total amount of the oxygen desorbed from the SCR catalyst (oxygen storage capacity) can be obtained by carrying out the calculation processing using the above-mentioned expression (1) in a repeated manner and integrating the results of the calculation, in a period of time in which the air fuel ratio of the exhaust gas is maintained at a rich air fuel ratio. When deterioration diagnosis of the SCR catalyst is carried out based on the oxygen storage capacity obtained by such a method, it becomes possible to make the deterioration diagnosis of the SCR catalyst by using existing oxygen concentration sensors and existing air fuel ratio sensors.

However, the oxygen storage capacity of the normal SCR catalyst is small in comparison with that of the three-way catalyst, the NSR catalyst, or the like, which includes an oxygen occlusion or storage material such as ceria. For that reason, when an error is included in the measured value of the first air fuel ratio sensor 7 or the second air fuel ratio sensor 8, the calculated value of the oxygen storage capacity may become smaller than the reference value in spite of the fact that the SCR catalyst is normal, or the calculated value of the oxygen storage capacity may become equal to or more than the reference value in spite of the fact that the SCR catalyst has deteriorated.

Accordingly, in this embodiment, at the time of obtaining the oxygen storage capacity of the SCR catalyst, processing is carried out in which a water gas shift reaction is induced (inducement-processing) at the time when the mixture is combusted in the internal combustion engine 1. The inducement-processing referred to herein is to induce a water gas shift reaction of carbon monoxide and water generated at the time of combustion of the mixture of a rich air fuel ratio, by adjusting the air fuel ratio of the mixture from a lean air fuel ratio, which is suitable for the operating state of the internal combustion engine 1, to a rich air fuel ratio which is suitable for the water gas shift reaction, when the operating state of the internal combustion engine 1 is in the lean operating region. As a method of adjusting the air fuel ratio of the mixture to be combusted in the internal combustion engine 1 to a rich air fuel ratio, there can be used a method of carrying out at least one of an increase of the amount of fuel injection and a decrease of the amount of intake air.

When the water gas shift reaction of carbon monoxide and water is caused to occur due to the execution of the inducement-processing, hydrogen and carbon dioxide are produced. The hydrogen produced by the water gas shift reaction arrives at the first air fuel ratio sensor 7, together with the exhaust gas. At that time, because the diffusion rate of the hydrogen is faster than that of any of the other exhaust gas components, most of the surface of the sensor element of the first air fuel ratio sensor 7 is covered with the hydrogen to become a rich atmosphere. As a result, a rich shift occurs in which the measured value of the first air fuel ratio sensor 7 becomes lower than an actual air fuel ratio of the exhaust gas. On the other hand, when the hydrogen having passed through the first air fuel ratio sensor 7 flows into the catalyst casing 5, the hydroxide ions (OH) combined with the transition metal of the SCR catalyst react with the hydrogen in the exhaust gas thereby to produce water. In other words, the hydrogen produced by the water gas shift reaction is oxidized and consumed in the catalyst casing 5. As a result, the rich shift of the second air fuel ratio sensor 8 becomes smaller than the rich shift of the first air fuel ratio sensor 7.

Accordingly, in cases where the above-mentioned inducement-processing has been carried out, there will also occur a difference between the measured value of the first air fuel ratio sensor 7 and the measured value of the second air fuel ratio sensor 8 resulting from the amount of hydrogen which is oxidized by the SCR catalyst in the catalyst casing 5, in addition to a difference therebetween resulting from the amount of oxygen to desorb from the SCR catalyst in the catalyst casing 5.

Here, in FIG. 3, there are shown the changes over time of the measured value of the first air fuel ratio sensor 7 and the measured value of the second air fuel ratio sensor 8 in the case of changing the air fuel ratio of the mixture to be combusted in the internal combustion engine 1 from a lean air fuel ratio to a rich air fuel ratio, in a normal state where the SCR catalyst in the catalyst casing 5 has not deteriorated. A solid line A in FIG. 3 represents the measured value of the second air fuel ratio sensor 8 (the air fuel ratio of the exhaust gas flowing out from the catalyst casing 5). An alternate long and short dash line B in FIG. 3 represents the measured value of the first air fuel ratio sensor 7 (i.e., the air fuel ratio of the exhaust gas flowing into the catalyst casing 5) in the case where a water gas shift reaction has occurred in the internal combustion engine 1 (i.e., in the case where hydrogen is contained in the exhaust gas). An alternate long and two short dashes line C in FIG. 3 represents the measured value of the first air fuel ratio sensor 7 (i.e., the air fuel ratio of the exhaust gas flowing into the catalyst casing 5) in the case where any water gas shift reaction has not occurred in the internal combustion engine 1 (i.e., in the case where hydrogen is not contained in the exhaust gas).

In FIG. 3, when the air fuel ratio of the exhaust gas discharged from the internal combustion engine 1 changes from a lean air fuel ratio to a rich air fuel ratio due to a change in the air fuel ratio of the mixture to be combusted in the internal combustion engine 1 from a lean air fuel ratio into a rich air fuel ratio (at t1 in FIG. 3), the measured value of the first air fuel ratio sensor 7 and the measured value of the second air fuel ratio sensor 8 begin to drop. Then, when the first air fuel ratio sensor 7 and the measured value of the second air fuel ratio sensor 8 begin to drop to a rich air fuel ratio which is lower than the stoichiometric air fuel ratio (at t2 in FIG. 3), oxygen will desorb from the SCR catalyst in the catalyst casing 5, and hence, the measured value of the second air fuel ratio sensor 8 becomes higher than the measured value of the first air fuel ratio sensor 7.

Here, if any water gas shift reaction has not occurred in the internal combustion engine 1, any rich shift does not occur in the first air fuel ratio sensor 7, and so, when all the oxygen stored in the SCR catalyst of the catalyst casing 5 has been desorbed, the measured value of the second air fuel ratio sensor 8 (the solid line A in FIG. 3) and the measured value of the first air fuel ratio sensor 7 (the alternate long and two short dashes line C in FIG. 3) become substantially the same value (at t3 in FIG. 3). On the other hand, in cases where a water gas shift reaction has occurred in the internal combustion engine 1, the hydrogen contained in the exhaust gas generates a rich shift of the first air fuel ratio sensor 7, but the hydrogen may be oxidized by the SCR catalyst in the catalyst casing 5, so a rich shift of the second air fuel ratio sensor 8 does not substantially occur. As a result, even after all the oxygen stored in the SCR catalyst of the catalyst casing 5 has been desorbed, there occurs a sufficient difference between the measured value of the second air fuel ratio sensor 8 (the solid line A in FIG. 3) and the measured value of the first air fuel ratio sensor 7 (the alternate long and short dash line B in FIG. 3). This difference continuously occurs until an end time point of the inducement-processing (at t4 in FIG. 3).

In this manner, in cases where the water gas shift reaction has occurred in the internal combustion engine 1, there occurs not only the difference between the measured value of the first air fuel ratio sensor 7 and the measured value of the second air fuel ratio sensor 8 resulting from the amount of oxygen to desorb from the SCR catalyst in the second catalyst casing 5, but also the difference therebetween resulting from the amount of hydrogen which is oxidized by the SCR catalyst in the second catalyst casing 5. As a result, in the case where the water gas shift reaction has occurred in the internal combustion engine 1, an integrated value of the difference (hereinafter, referred to as a "total sensor output difference") between the measured value of the second air fuel ratio sensor 8 (the solid line A in FIG. 3) and the measured value of the first air fuel ratio sensor 7 (the alternate long and short dash line B in FIG. 3) in an execution period of time of the inducement-processing (t1-t5 in FIG. 3) becomes larger, in comparison with the case where the water gas shift reaction has not occurred.

On the other hand, when the SCR catalyst in the catalyst casing 5 deteriorates, both of the oxygen storage ability and the hydrogen oxidation ability of the SCR catalyst drop or decrease. For that reason, in the case where the SCR catalyst in the catalyst casing 5 has deteriorated, the oxygen storage capacity of the SCR catalyst decreases, and the amount of hydrogen oxidized by the SCR catalyst also decreases, in comparison with the case where the SCR catalyst in the catalyst casing 5 has not deteriorated. As the oxygen storage capacity of the SCR catalyst decreases, the amount of oxygen to desorb from the SCR catalyst at the time of the execution of the inducement-processing becomes smaller. As a result, the difference between the measured value of the first air fuel ratio sensor 7 and the measured value of the second air fuel ratio sensor 8 becomes smaller. In addition, as the amount of hydrogen oxidized by the SCR catalyst becomes smaller, the amount of hydrogen arriving at the second air fuel ratio sensor 8 without being oxidized by the SCR catalyst in the catalyst casing 5 at the time of the execution of the inducement-processing increases, and the rich shift of the second air fuel ratio sensor 8 becomes accordingly larger. As a result, the difference between the measured value of the first air fuel ratio sensor 7 and the measured value of the second air fuel ratio sensor 8 becomes smaller.

Accordingly, in the case where the SCR catalyst in the catalyst casing 5 has not deteriorated, the total sensor output difference becomes large due to the synergetic effect of the oxygen storage ability and the hydrogen oxidation ability of the SCR catalyst, but in contrast to this, in the case where the SCR catalyst in the catalyst casing 5 has deteriorated, the total sensor output difference becomes small due to the synergetic effect of a decrease in the oxygen storage ability and a decrease in the hydrogen oxidation ability of the SCR catalyst. As a result, a remarkable difference occurs in the total sensor output difference between the case where the SCR catalyst in the catalyst casing 5 has not deteriorated and the case where the SCR catalyst has deteriorated.

When a remarkable difference occurs in the total sensor output difference between the case where the SCR catalyst in the catalyst casing 5 has deteriorated and the case where the SCR catalyst has not deteriorated, even in cases where an error is included in the measured value of the first air fuel ratio sensor 7 or the measured value of the second air fuel ratio sensor 8, the influence of the error becomes small. Accordingly, the total sensor output difference in the period of time of the execution of the inducement-processing is obtained, and a diagnosis of the deterioration of the SCR catalyst (diagnosis processing) should only be made based on the total sensor output difference.

However, the amount of oxygen to desorb from the SCR catalyst in the catalyst casing 5 and the amount of hydrogen to be oxidized in the SCR catalyst at the time of the execution of the inducement-processing may vary according to the amount of $NH_3$ adsorption in the SCR catalyst. For example, as shown in FIG. 4, the larger the amount of $NH_3$ adsorption in the SCR catalyst, the smaller become the amount of oxygen to desorb from the SCR catalyst (the amount of oxygen desorption) and the amount of hydrogen oxidized by the SCR catalyst (the amount of hydrogen oxidation) at the time of the execution of the inducement-processing. In other words, when the amount of $NH_3$ adsorption in the SCR catalyst is large, the amount of oxygen desorption and the amount of hydrogen oxidation become smaller, in comparison with the time when the amount of $NH_3$ adsorption in the SCR catalyst is small. This is considered to be due to that the ammonia adsorbed to the SCR catalyst is combined with the oxygen stored in the SCR catalyst, whereby the desorption of oxygen is inhibited, and so, the reaction of hydrogen and oxygen is also accordingly inhibited. Then, it is considered that as the amount of $NH_3$ adsorption in the SCR catalyst increases, the oxygen combined with ammonia also increases, so that the amount of oxygen to desorb from the SCR catalyst and the amount of hydrogen oxidized in the SCR catalyst at the time of the execution of the inducement-processing decrease. Thus, when variations in the amount of oxygen desorption and in the amount of hydrogen oxidation resulting from the amount of $NH_3$ adsorption in the SCR catalyst occur, the total sensor output difference will also vary accordingly, so that it may become difficult to diagnose the deterioration state of the SCR catalyst in an accurate manner.

Accordingly, in this embodiment, the inducement-processing is carried out, when the operating state of the internal combustion engine 1 is in a lean operating region, and when the amount of $NH_3$ adsorption in the SCR catalyst is equal to or less than a predetermined upper limit value. The "predetermined upper limit value" referred to herein is a value at which it is considered that even if the inducement-processing is carried out in a state where an amount of $NH_3$ equal to or less than the predetermined upper limit value has been adsorbed to the SCR catalyst, a remarkable difference occurs between the total sensor output difference in the case where the SCR catalyst is normal and the total sensor output difference in the case where the SCR catalyst has deteriorated, and it is a value which is decided according to the degree of deterioration of the SCR catalyst which should be detected by the deterioration diagnosis. For example, in the case where the degree of deterioration of the SCR catalyst, which should be detected by the deterioration diagnosis, is small, the above-mentioned predetermined upper limit value should only be set to a smaller value, in comparison with the case of the degree of deterioration of the SCR catalyst is large. Thus, when the predetermined upper limit value is set in this manner, the variation in the total sensor output difference resulting from the amount of $NH_3$ adsorption in the SCR catalyst will become sufficiently small with respect to the difference between the total sensor output difference in the case where the SCR catalyst is normal and the total sensor output difference in the case where the SCR catalyst has deteriorated. As a result, it is possible to suppress the reduction in accuracy of the diagnosis resulting from the amount of $NH_3$ adsorption in the SCR catalyst.

In the following, a procedure of diagnosing the deterioration of the SCR catalyst in this embodiment will be explained along FIG. 5. FIG. 5 is a flow chart showing a processing routine which is executed by the ECU 6 at the time of making a deterioration diagnosis of the SCR catalyst. The processing routine in FIG. 5 has been beforehand stored in the ROM of the ECU 6, and is repeatedly carried out in a repeated manner during the operation period of the internal combustion engine 1. Here, note that this processing routine is carried out when the SCR catalyst in the catalyst casing 5 has been activated, and when the first air fuel ratio sensor 7 and the second air fuel ratio sensor 8 are normal. In addition, when the inducement-processing is carried out in a state where the amount of intake air is relatively small, the period of time of the execution of the inducement-processing may be prolonged. On the other hand, when the inducement-processing is carried out in a state where the amount of intake air is relatively large, the amount of hydrogen passing through the SCR catalyst may become large. Accordingly, a range of the amount of intake air may have been obtained in advance in which the length of the execution period of time of the inducement-processing and the amount of hydrogen passing through the SCR catalyst become optimal balance, and a condition that an actual amount of intake air (a measured value of the air flow meter 12) falls in the range may be added or used as an execution condition for the inducement-processing. Moreover, the temperature of the SCR catalyst may change during the execution of the inducement-processing, and when a change in the amount of hydrogen oxidation with respect to a change in the temperature of the SCR catalyst becomes large, a change in the total sensor output difference resulting from the temperature change may become large. Accordingly, a temperature range has been obtained in advance in which the change in the amount of hydrogen oxidation with respect to the temperature change of the SCR catalyst becomes relatively small, and a condition that the temperature of the SCR catalyst belongs to the temperature range may also be added to the above-mentioned execution condition for the inducement-processing.

In the processing routine of FIG. 5, first in the processing of step S101, the ECU 6 determines whether the operating state of the internal combustion engine 1 belongs to the lean operating region, in other words, whether the internal combustion engine 1 is operated by combusting the mixture of a lean air fuel ratio. In cases where a negative determination is made in the processing of step S101, the ECU 6 ends the execution of this processing routine, by resetting to zero a total sensor output difference $\Sigma\Delta A/F$, which will be described later in the processing of step S115. On the other hand, in cases where an affirmative determination is made in the above-mentioned processing of step S101, the routine of the ECU 6 goes to the processing of step S102.

In the processing of step S102, the ECU 6 obtains an amount of $NH_3$ adsorption Adnh3 in the SCR catalyst. The amount of $NH_3$ adsorption Adnh3 in the SCR catalyst is obtained by carrying out processing to integrate a difference between an amount of addition of ammonia and an amount of ammonia contributing to the reduction of NOx in a repeated manner during the operation period of the internal combustion engine 1, as mentioned above, and it is acquired by the ECU 6 reading in the latest value thereof.

In the processing of step S103, the ECU 6 determines whether the amount of $NH_3$ adsorption Adnh3 obtained in the above-mentioned processing of step S102 is equal to or less than a predetermined upper limit value Thrnh3. In cases where a negative determination is made in the processing of step S103 (Adnh3>Thrnh3), the ECU 6 ends the execution of this processing routine, by carrying out the processing of step S115. On the other hand, in cases where an affirmative determination is made in the processing of step S103 (Adnh3≤Thrnh3), the ECU 6 goes to the processing of step S104.

In the processing of S104, the ECU 6 inhibits the addition of ammonia (addition processing) by the addition device 50 in order to avoid a situation where the amount of $NH_3$ adsorption in the SCR catalyst increases in the course of the execution of the inducement-processing. Then, the routine of the ECU 6 goes to the processing of step S105, where the inducement-processing is started. Specifically, the ECU 6 changes the air fuel ratio of the mixture to be combusted in the internal combustion engine 1 from a lean air fuel ratio into a rich air fuel ratio, by performing at least one of increasing the amount of fuel injection, and decreasing of the amount of intake air (e.g., decreasing the degree of opening of an unillustrated throttle valve).

After carrying out the above-mentioned processing of step S105, the routine of the ECU 6 goes to the processing of step S106, where a measured value Raf1 of the first air fuel ratio sensor 7 and a measured value Raf2 of the second air fuel ratio sensor 8. Subsequently, the routine of the ECU 6 goes to the processing of step S107, where a sensor output difference $\Delta A/F$ is calculated by subtracting the measured value Raf1 of the first air fuel ratio sensor 7 from the measured value Raf2 of the second air fuel ratio sensor 8 read in the above-mentioned step S106. Then, in the processing of step S108, the ECU 6 calculates the integrated value (total sensor output difference) $\Sigma\Delta A/F$ of the sensor output difference $\Delta A/F$ in a period of time from the start of the inducement-processing to the current point in time. Specifically, the ECU 6 calculates the total sensor output difference $\Sigma\Delta A/F$ in the period of time from the start of the inducement-processing to the current point in time, by adding the difference $\Delta A/F$ thus calculated in the above-mentioned processing of step S107 to an integrated value $\Sigma\Delta A/Fold$ of the sensor output difference $\Delta A/F$ in a period of time from the start of the inducement-processing to the time of the last execution of step S108.

In addition, in the processing of step S109, the ECU 6 determines whether a predetermined period of time has elapsed from the start of the inducement-processing. The predetermined period of time referred to herein is a period of time which is set in such a manner that the difference between the total sensor output difference in the case where the SCR catalyst is normal and the total sensor output difference in the case where the SCR catalyst has deteriorated becomes sufficiently large, as compared with a difference resulting from a measurement error of the first air fuel ratio sensor 7 or the second air fuel ratio sensor 8. At that time, the predetermined period of time may also be set as a period of time taken for the amount of hydrogen produced by the water gas shift reaction to reach a fixed amount which has been set in advance, or may also be set as a period of time taken for the amount of hydrogen oxidized by the SCR catalyst to reach a fixed amount set in advance in the case of assuming that the SCR catalyst is normal.

In cases where a negative determination is made in the above-mentioned processing of step S109, the routine of the ECU 6 returns to the processing of step S106, where the inducement-processing is continuously carried out. On the other hand, in cases where an affirmative determination is made in the above-mentioned processing of step S109, the routine of the ECU 6 goes to the processing of step S110, where the inducement-processing is ended. In other words, the ECU 6 returns the air fuel ratio of the exhaust gas flowing into the catalyst casing 5 from the rich air fuel ratio to a lean air fuel ratio which is suitable for the operating condition of the internal combustion engine 1. Here, note that a "control unit" according to the present invention is achieved by carrying out the processings of steps S101, S103, S104-S105, and S109-S111 by means of the ECU 6.

After the inducement-processing is ended in the above-mentioned processing of step S110, the ECU 6 goes to step S111, and cancels the inhibition of addition of ammonia (addition processing) by the addition device 50. At that time, the ECU 6 should only control the amount of ammonia to be added from the addition device 50 based on the amount of $NH_3$ adsorption in the SCR catalyst at the end time point of the inducement-processing. Subsequently, the ECU 6 goes to the processing of step S112, where it is determined whether the total sensor output difference $\Sigma\Delta A/F$ calculated in the above-mentioned processing of step S108 is equal to or larger than a predetermined threshold value Threa/f. The "predetermined threshold value Threa/f" referred to herein is a value at which it can be considered that when the total sensor output difference $\Sigma\Delta A/F$ is less than the predetermined threshold value Threa/f, the NOx reduction performance of the SCR catalyst has deteriorated, and which can be obtained in advance by adaptation processing making the use of experiments, etc.

In cases where an affirmative determination is made in the above-mentioned processing of step S112 ($\Sigma\Delta A/F \geq$ Threa/f), the ECU 6 goes to the processing of step S113, where a determination is made that the SCR catalyst has not deteriorated (normal). On the other hand, in cases where a negative determination is made in the above-mentioned processing of step S112 ($\Sigma\Delta A/F <$ Threa/f), the routine of the ECU 6 goes to the processing of step S114, where a determination is made that the SCR catalyst has deteriorated. In that case, the ECU 6 may prompt to repair the catalyst casing 5 by using an alarm lamp, a display unit, or the like, which is arranged in a passenger compartment of the vehicle. After the execution of the above-mentioned processing of step S113 or S114, the routine of the ECU 6 goes to the processing of step S115, where the total sensor output difference $\Sigma\Delta A/F$ is reset to zero. Here, note that a "diagnosis unit" according to the present invention is achieved by carrying out the processings of steps S106-S108 and S112-S114 by means of the ECU 6.

In cases where the deterioration diagnosis of the SCR catalyst is carried out according to the procedure described above, the inducement-processing will be carried out, when the amount of $NH_3$ adsorption in the SCR catalyst is small to such an extent that it does not affect diagnostic accuracy. As a result, the variation in the total sensor output difference $\Sigma\Delta A/F$ resulting from the variation in the amount of $NH_3$ adsorption in the SCR catalyst becomes small, so that the deterioration state of the SCR catalyst is reflected on the total sensor output difference $\Sigma\Delta A/F$ in an accurate manner. Accordingly, it becomes possible to diagnose the deterioration state of the SCR catalyst in an accurate manner.

Here, note that in the processing routine of FIG. 5, the deterioration diagnosis of the SCR catalyst received in the catalyst casing 5 is carried out based on the integrated value of the difference (the total sensor output difference) between the measured value of the first air fuel ratio sensor 7 and the measured value of the second air fuel ratio sensor 8 in the period of time of the execution of the inducement-processing, but the deterioration diagnosis of the SCR catalyst in the catalyst casing 5 may be made based on the integrated value of a value (Aox) which is obtained by substituting the difference between the measured value of the first air fuel ratio sensor 7 and the measured value of the second air fuel ratio sensor 8 into the above-mentioned expression (1).

Second Embodiment

Next, reference will be made to a second embodiment of the present invention based on FIGS. 6 through 9. Here, a construction different from that of the above-mentioned first embodiment will be described, and an explanation of the same construction will be omitted. FIG. 6 is a view showing the schematic construction of an exhaust system of an internal combustion engine in this second embodiment of the present invention. In FIG. 6, the same symbols are attached to the same components as those in FIG. 1 in the above-mentioned first embodiment. The difference between the above-mentioned FIG. 1 and FIG. 6 is that a catalyst casing 4 having an NSR catalyst received therein is disposed in the exhaust pipe 3 at the upstream side of the catalyst casing 5 with the SCR catalyst received therein, instead of the addition device 50. Hereinafter, the catalyst casing 4 with the NSR catalyst received therein is referred to as a first catalyst casing 4, and the catalyst casing 5 with the SCR catalyst received therein is referred to as a second catalyst casing 5.

The first catalyst casing 4 receives a honeycomb structured body covered with a coat layer such as alumina, a precious metal (platinum (Pt), palladium (Pd), etc.) supported by the coat layer, a promoter or co-catalyst such as ceria ($CeO_2$) supported by the coat layer, and an NOx occlusion or storage agent (alkalines, alkaline earths, etc.) supported by the coat layer.

An NOx sensor 13, in addition to the above-mentioned first air fuel ratio sensor 7, is mounted on the exhaust pipe 3 at a location between the first catalyst casing 4 and the second catalyst casing 5. The NOx sensor 13 is a sensor that outputs an electrical signal which is correlated with a concentration of NOx contained in the exhaust gas flowing out from the first catalyst casing 4. The output signal of the NOx sensor 13 is inputted to the ECU 6.

In such an arrangement, the ECU 6 carries out rich spike processing in an appropriate manner, when the operating state of the internal combustion engine 1 is in the above-mentioned lean operating region. The rich spike processing is to adjust the amount of fuel injection and the amount of intake air in such a manner that the concentration of oxygen in the exhaust gas becomes low and the concentration of hydrocarbon or carbon monoxide becomes high. The rich spike processing is carried out in order to reduce the NOx stored in the NSR catalyst of the first catalyst casing 4. The NSR catalyst received in the first catalyst casing 4 stores or adsorbs NOx in the exhaust gas, when the oxygen concentration of the exhaust gas flowing into the first catalyst casing 4 is high (i.e., when the air fuel ratio of the exhaust gas is a lean air fuel ratio), and releases the NOx stored in the NSR catalyst so as to reduce the NOx thus released to nitrogen ($N_2$) or ammonia ($NH_3$), when the oxygen concentration of the exhaust gas flowing into the first catalyst casing 4 is low, and when reducing components such as hydrocarbon (HC), carbon monoxide (CO), etc., are contained in the exhaust gas (i.e., when the air fuel ratio of the exhaust gas is a rich air fuel ratio). For that reason, when the rich spike processing is carried out, the NOx stored in the NSR catalyst is reduced, so that the NOx occlusion or storage ability of the NSR catalyst is thereby regenerated.

Accordingly, the ECU 6 suppresses the NOx storage ability of the NSR catalyst 4 from being saturated, by carrying out the rich spike processing, when the amount of NOx stored in the NSR catalyst becomes equal to or larger than a fixed amount, or when the operation time of the internal combustion engine 1 from the end time of the last rich spike processing (preferably, the operation time in which the target air fuel ratio has been set to the lean air fuel ratio) becomes equal to or more than a fixed period of time, or when the travel distance of a vehicle, on which the internal combustion engine 1 is mounted, from the end time of the last rich spike processing (preferably, the travel distance within which the target air fuel ratio has been set to the lean air fuel ratio) becomes equal to or more than a fixed distance.

Here, note that as a specific method of carrying out the rich spike processing, there can be used a method of decreasing the air fuel ratio of a mixture to be supplied for combustion in the internal combustion engine 1, by carrying out at least one of the processing steps to increase the amount of fuel injection, and the processing to decrease the amount of intake air. In addition, in a construction in which a fuel injection valve 2 injects fuel directly into a cylinder, the rich spike processing may be carried out by a method of injecting fuel from the fuel injection valve 2 in the exhaust stroke of the cylinder.

In addition, the ECU 6 carries out the rich spike processing in the case of supplying ammonia to the SCR catalyst in the second catalyst casing 5, too, in addition to the case of regenerating the NOx storage ability of the NSR catalyst in the first catalyst casing 4. In cases where the rich spike processing is carried out, a part of the NOx desorbed from the NSR catalyst in the first catalyst casing 4 reacts with hydrocarbon or hydrogen in the exhaust gas so as to be reduced to ammonia. At that time, the amount of ammonia produced in the NSR catalyst changes according to the interval in which the rich spike processing is carried out, the air fuel ratio of the exhaust gas at the time when the rich spike processing is carried out, etc. Accordingly, when it is necessary to supply $NH_3$ to the SCR catalyst, the ECU 6 may set the interval of execution of the rich spike processing to an interval suitable for production of ammonia, or may set the air fuel ratio of the exhaust gas at the time of the execution of the rich spike processing to an air fuel ratio (e.g., 14.1 or thereabout) suitable for production of ammonia.

When the rich spike processing is carried out according to a variety of purposes as referred to above, even in cases where the lean burn operation of the internal combustion engine 1 is carried out, the NOx in the exhaust gas can be reduced or removed. However, when the SCR catalyst received in the second catalyst casing 5 deteriorates, the NOx having not been fully reduced by the first catalyst casing 4 may be discharged into the atmosphere, without being reduced by the second catalyst casing 5. For that reason, in the arrangement shown in FIG. 6, too, it is necessary to detect the deterioration of the SCR catalyst in the second catalyst casing 5 in a quick manner, as in the above-mentioned first embodiment.

Hereinafter, reference will be made to a method of diagnosing deterioration of the SCR catalyst in the catalyst casing 5 in this second embodiment. Here, as the method of diagnosing the deterioration of the SCR catalyst, similar to the above-mentioned first embodiment, there can be considered a method in which when the amount of $NH_3$ adsorption in the SCR catalyst is equal to or less than the predetermined upper limit value, inducement-processing is carried out, and deterioration of the SCR catalyst is diagnosed based on a total sensor output difference in a period of time of the execution of the inducement-processing. According to such a method, a water gas shift reaction occurs at the time when a mixture of a rich air fuel ratio combusts in the internal combustion engine 1, and a water gas shift reaction also occurs in the NSR catalyst in the first catalyst casing 4, too. For that reason, it is possible to increase the amount of hydrogen contained in the exhaust gas flowing into the second catalyst casing 5.

However, when the inducement-processing is carried out in a state where the NSR catalyst in the first catalyst casing 4 has stored NOx, the NOx stored in the NSR catalyst may desorb from the NSR catalyst, and a part thereof may react with hydrocarbon or hydrogen in the exhaust gas to produce ammonia. The ammonia thus produced flows into the second catalyst casing 5 together with the exhaust gas, so that it is adsorbed to the SCR catalyst therein. As a result, the amount of $NH_3$ adsorption in the SCR catalyst may exceed the above-mentioned predetermined upper limit value in the course of the execution of the inducement-processing.

Accordingly, in the arrangement in which the NSR catalyst is disposed at the upstream side of the SCR catalyst, it is desirable to carry out the inducement-processing, when the amount of $NH_3$ adsorption in the SCR catalyst is sufficiently smaller than the above-mentioned predetermined upper limit value.

Accordingly, in this second embodiment, the inducement-processing is carried out, when the operating state of the internal combustion engine 1 is in a lean operating region, and when the amount of $NH_3$ adsorption in the SCR catalyst is equal to or less than a predetermined value which is smaller than the above-mentioned upper limit value. The "predetermined value" referred to herein is a value which is obtained by subtracting from the predetermined upper limit value an amount of ammonia (an amount of $NH_3$ production) produced in the NSR catalyst in the first catalyst casing 4, in the case of assuming that the inducement-processing has been carried out. Here, note that the amount of $NH_3$ production is correlated with the storage amount of NOx in the NSR catalyst. For example, the larger the storage amount of NOx in the NSR catalyst, the larger the amount of $NH_3$ production tends to become. For that reason, it is preferable that the predetermined value be changed according to the storage amount of NOx in the NSR catalyst. Here, the correlation between the amount of $NH_3$ production and the storage amount of NOx may have been experimentally obtained in advance, and the correlation thus obtained may have been stored in the ROM of the ECU 6 as a map or a function expression. In that case, the amount of $NH_3$ production in the case of the inducement-processing being carried out can be obtained by accessing the map or the function expression by using the storage amount of NOx in the NSR catalyst as an argument. Then, the above-mentioned predetermined value can be obtained by subtracting the amount of $NH_3$ production from the above-mentioned predetermined upper limit value. In addition, the storage amount of NOx in the NSR catalyst may be calculated by using, as parameters, the operation history of the internal combustion engine 1 (e.g., the history of the amount of fuel injection, the amount of intake air, etc., in the case when the operating state of the internal combustion engine 1 is in the lean operating region), the temperature of the NSR catalyst, etc. An "calculation unit" according to the present invention is achieved by calculating the storage amount of NOx in the NSR catalyst in this manner.

Here, in FIG. 7, there is shown the change over time of the amount of $NH_3$ adsorption in the case of carrying out the inducement-processing, when the amount of $NH_3$ adsorption in the SCR catalyst is equal to or less than the predetermined value which is smaller than the above-mentioned predetermined upper limit value. In FIG. 7, "Eng-Out A/F" represents the air fuel ratio of the exhaust gas discharged from the internal combustion engine 1. "NSR-Out A/F" represents the air fuel ratio of the exhaust gas flowing out from the NSR catalyst (the exhaust gas flowing into the SCR catalyst). "SCR-Out A/F" represents the air fuel ratio of the exhaust gas flowing out from the SCR catalyst. "Storage amount of NOx" represents the storage amount of NOx in the NSR catalyst. "NSR-Out $NH_3$" represents the concentration of ammonia contained in the exhaust gas flowing out from the NSR catalyst (the exhaust gas flowing into the SCR catalyst). "Amount of $NH_3$ adsorption" represents the amount of $NH_3$ adsorption in the SCR catalyst.

In FIG. 7, when the inducement-processing is started, the air fuel ratio of the mixture to be combusted in the internal combustion engine 1 is changed from a lean air fuel ratio into a rich air fuel ratio (t1 in FIG. 7). Then, when the air fuel ratio (Eng-Out A/F) of the exhaust gas discharged from the internal combustion engine 1 changes from a lean air fuel ratio to a rich air fuel ratio (t2 in FIG. 7), the oxygen and the NOx stored in the NSR catalyst desorb from the NSR catalyst, and the NOx desorbed from the NSR catalyst is reduced by hydrocarbon in the exhaust gas. In that case, the air fuel ratio of the exhaust gas is made higher under the action of the oxygen desorbed from the NSR catalyst, and in addition, the air fuel ratio of the exhaust gas is also increased by the hydrocarbon in the exhaust gas being consumed by the reduction of NOx. For that reason, the air fuel ratio (NSR-Out A/F) of the exhaust gas flowing out from the NSR catalyst remains at the stoichiometric air fuel ratio, without dropping to a rich air fuel ratio. Thereafter, when the oxygen and the NOx stored in the NSR catalyst have been fully desorbed (t3 in FIG. 7), the air fuel ratio (NSR-Out A/F) of the exhaust gas flowing out from the NSR catalyst changes from the stoichiometric air fuel ratio to a rich air fuel ratio. When the air fuel ratio (NSR-Out A/F) of the exhaust gas flowing out from the NSR catalyst changes from the stoichiometric air fuel ratio to a rich air fuel ratio, the oxygen stored in the SCR catalyst desorbs therefrom, so that the air fuel ratio (SCR-Out A/F) of the exhaust gas flowing out from the SCR catalyst is maintained at the stoichiometric air fuel ratio. Then, when the oxygen stored in the SCR catalyst has been fully desorbed (t4 in FIG. 7), the air fuel ratio (SCR-Out A/F) of the exhaust gas flowing out from the SCR catalyst changes from the stoichiometric air fuel ratio to a rich air fuel ratio.

Moreover, in a period of time (i.e., a period of time from t2 to t3 in FIG. 7) in which the NOx stored in the NSR catalyst desorbs from the NSR catalyst and is reduced, the storage amount of NOx in the NSR catalyst decreases, and at the same time, the concentration of $NH_3$ in the exhaust gas flowing out from the NSR catalyst increases. As the concentration of $NH_3$ in the exhaust gas flowing out from the NSR catalyst increases, the amount of $NH_3$ adsorption in the SCR catalyst also accordingly increases. However, when the inducement-processing is carried out in a state where the amount of $NH_3$ adsorption in the SCR catalyst is equal to or less than the above-mentioned predetermined value, even if the amount of $NH_3$ adsorption is increased due to the ammonia produced in the NSR catalyst, the amount of $NH_3$ adsorption after thus increased falls equal to or less than the above-mentioned predetermined upper limit value. In this manner, if the inducement-processing is carried out when the amount of $NH_3$ adsorption in the SCR catalyst is equal to or less than the predetermined value, the magnitude of the variation in the total sensor output difference in the execution period of time of the inducement-processing will become sufficiently small in comparison with the difference between the total sensor output difference in the case where the SCR catalyst is normal and the total sensor output difference in the case where the SCR catalyst has deteriorated. As a result, it is possible to suppress the reduction in accuracy of the diagnosis resulting from the variation in the amount of $NH_3$ adsorption.

However, when the inducement-processing is controlled to be carried out only in the case where the amount of $NH_3$ adsorption in the SCR catalyst becomes equal to or less than the predetermined value in the course of nature, the opportunity of carrying out diagnosis processing becomes small, and so, it may become impossible to detect the deterioration of the SCR catalyst at an early stage. Accordingly, when the operating state of the internal combustion engine 1 is in the lean operating region, and when the amount of $NH_3$ adsorption in the SCR catalyst is more than the above-mentioned predetermined value, processing positively to decrease the storage amount of NOx in the NSR catalyst and the amount of $NH_3$ adsorption in the SCR catalyst ($NH_3$-consuming-processing) is carried out, and the inducement-processing is carried out after the execution of the $NH_3$-consuming-processing.

The $NH_3$-consuming-processing referred to herein is to change the air fuel ratio of the mixture to be combusted in the internal combustion engine 1 into the stoichiometric air fuel ratio from a lean air fuel ratio suitable for the operating state of the internal combustion engine 1. When the air fuel ratio of the mixture to be combusted in the internal combustion engine 1 is changed into the stoichiometric air fuel ratio from the lean air fuel ratio, the air fuel ratio of the exhaust gas flowing into the NSR catalyst of the first catalyst casing 4 accordingly changes from a lean air fuel ratio to the stoichiometric air fuel ratio. As the exhaust gas of the stoichiometric air fuel ratio flows into the NSR catalyst, the NOx stored in the NSR catalyst desorbs from the NSR catalyst. At that time, reducing components such as hydrocarbon, etc., are not substantially contained in the exhaust gas of the stoichiometric air fuel ratio, so that the NOx desorbed from the NSR catalyst flows out from the first catalyst casing 4, without being reduced. When the NOx having flowed out from the first catalyst casing 4 flows into the SCR catalyst in the second catalyst casing 5, the NOx reacts with the ammonia adsorbed to the SCR catalyst, so that it is reduced to nitrogen ($N_2$). As a result, the storage amount of NOx in the NSR catalyst and the amount of $NH_3$ adsorption in the SCR catalyst will decrease. Such $NH_3$-consuming-processing may be carried out until the amount of $NH_3$ adsorption in the SCR catalyst becomes equal to or less than the above-mentioned predetermined value, or may be carried out until the storage amount of NOx in the NSR catalyst becomes zero.

Here, note that when the amount of $NH_3$ adsorption in the SCR catalyst is sufficiently large with respect to the storage amount of NOx in the NSR catalyst, there is a possibility that even when the $NH_3$-consuming-processing is carried out until the storage amount of NOx in the NSR catalyst becomes zero, the amount of $NH_3$ adsorption in the SCR catalyst cannot be decreased to the predetermined value or below. In contrast to this, in this second embodiment, an amount of $NH_3$ adsorption in the SCR catalyst (the amount of residual $NH_3$) at the end time point of the $NH_3$-consuming-processing in the case of assuming that the $NH_3$-consuming-processing is carried out is estimated, and when the amount of residual $NH_3$ is equal to or less than the predetermined upper limit value, the $NH_3$-consuming-processing is carried out. Here, note that the amount of residual $NH_3$ is obtained by calculating an amount of ammonia (an amount of $NH_3$ consumption) to be consumed in the case of assuming that an amount of NOx equal to the storage amount of NOx in the NSR catalyst is reduced by the SCR catalyst, and by subtracting the amount of $NH_3$ consumption thus calculated from the amount of $NH_3$ adsorption in the SCR catalyst.

Here, in FIG. 8, there is shown the change over time of the amount of $NH_3$ adsorption in the case of carrying out the $NH_3$-consuming-processing and the inducement-processing, when the amount of $NH_3$ adsorption in the SCR catalyst is more than the above-mentioned predetermined value, and when the amount of residual $NH_3$ is smaller than the predetermined value. In FIG. 8, "Eng-Out A/F", "NSR-Out A/F", "SCR-Out A/F", "Storage amount of NOx", "NSR-Out $NH_3$", and "Amount of $NH_3$ adsorption" are the same parameters as those in the above-mentioned FIG. 7. "NSR- Out NOx" in FIG. 8 represents the NOx concentration of the exhaust gas flowing out from the NSR catalyst.

In FIG. 8, when the $NH_3$-consuming-processing is started (t5 in FIG. 8), the air fuel ratio of the mixture to be combusted in the internal combustion engine 1 is changed from a lean air fuel ratio into the stoichiometric air fuel ratio. Then, when the air fuel ratio (Eng-Out A/F) of the exhaust gas discharged from the internal combustion engine 1 changes from a lean air fuel ratio to the stoichiometric air fuel ratio (t6 in FIG. 8), the NOx stored in the NSR catalyst desorbs from the NSR catalyst, and the NOx thus desorbed flows out from the NSR catalyst, without being reduced. For that reason, the NOx concentration (NSR-Out NOx) of the exhaust gas flowing out from the NSR catalyst increases, and at the same time, the storage amount of NOx in the NSR catalyst decreases. In addition, the NOx desorbed from the NSR catalyst flows out from the NSR catalyst, without being reduced, as mentioned above, so that the concentration of $NH_3$ in the exhaust gas flowing out from the NSR catalyst becomes substantially the same concentration as before the execution of the $NH_3$-consuming-processing. Then, the NOx having flowed out from the NSR catalyst reacts with the ammonia adsorbed to the SCR catalyst, whereby the amount of $NH_3$ adsorption in the SCR catalyst decreases. When the $NH_3$-consuming-processing is carried out until the desorption of NOx from the NSR catalyst ends (t7 in FIG. 8), the amount of $NH_3$ adsorption in the SCR catalyst decreases to the above-mentioned predetermined value or below. Here, note that in the case where the storage amount of NOx in the NSR catalyst is decreased to zero by the execution of the $NH_3$-consuming-processing, the predetermined value becomes equal to the predetermined upper limit value, and hence, the predetermined value in FIG. 8 can also be put in another way as the predetermined upper limit value. When the inducement-processing is carried out in the state where the amount of $NH_3$ adsorption in the SCR catalyst has decreased to the predetermined value (the predetermined upper limit value), it becomes possible to suppress the amount of $NH_3$ adsorption in the SCR catalyst from becoming larger than the predetermined upper limit value in the course of the execution of the inducement-processing. As a result, the total sensor output difference in the period of time of the execution of the inducement-processing becomes a value on which the deterioration state of the SCR catalyst has been reflected. Accordingly, even in the case where the amount of $NH_3$ adsorption in the SCR catalyst is larger than the predetermined value, by carrying out the $NH_3$-consuming-processing before the execution of the inducement-processing, it becomes possible to diagnose the deterioration state of the SCR catalyst in an accurate manner.

In the following, a procedure of diagnosing the deterioration of the SCR catalyst in this second embodiment will be explained along FIG. 9. FIG. 9 is a flow chart showing a processing routine which is executed by the ECU 6 at the time of making a deterioration diagnosis of the SCR catalyst. In FIG. 9, the same symbols are attached to the same processing steps as those in the above-mentioned processing routine of FIG. 5. Here, note that the processing routine shown in FIG. 9 is carried out under the following conditions: the SCR catalyst in the second catalyst casing 5 has been activated; the first air fuel ratio sensor 7 and the second air fuel ratio sensor 8 are normal; the amount of intake air and the temperature of the SCR catalyst fall in predetermined ranges, respectively; and the NSR catalyst in the first catalyst casing 4 has been activated.

In the processing routine of FIG. 9, in cases where an affirmative determination is made in the processing of step S101, the routine of the ECU 6 goes to the processing of step S201, where an amount of $NH_3$ adsorption Adnh3 in the SCR catalyst and a storage amount of NOx Stnox in the NSR catalyst are obtained. Here, the amount of $NH_3$ adsorption in the SCR catalyst is obtained by calculating the balance (income and outgo) of ammonia between the amount of ammonia to be supplied to the SCR catalyst, and the amount of ammonia consumed in order to reduce the NOx flowing into the SCR catalyst. Note that the ammonia to be supplied to the SCR catalyst is produced in the NSR catalyst when the air fuel ratio of the exhaust gas is a rich air fuel ratio. Then, when the air fuel ratio of the exhaust gas is a rich air fuel ratio, the NOx in the exhaust gas is reduced by the NSR catalyst, and hence, the measured value of the NOx sensor 13 at the time of the air fuel ratio of the exhaust gas being a rich air fuel ratio becomes a value correlated with the amount of ammonia to be supplied to the SCR catalyst. On the other hand, when the air fuel ratio of the exhaust gas is the stoichiometric air fuel ratio or a lean air fuel ratio, ammonia is not substantially produced in the NSR catalyst, and hence, the measured value of the NOx sensor 13 at the time of the air fuel ratio of the exhaust gas being a lean air fuel ratio becomes a value correlated with the amount of NOx flowing into the SCR catalyst. Accordingly, the amount of $NH_3$ adsorption in the SCR catalyst can be calculated by using, as parameters, the measured value of the NOx sensor 13 at the time of the air fuel ratio of the exhaust gas being a rich air fuel ratio, and the measured value of the NOx sensor 13 at the time of the air fuel ratio of the exhaust gas being equal to or higher than the stoichiometric air fuel ratio. In addition, the storage amount of NOx Stnox in the NSR catalyst can be calculated by using, as parameters, the operation history of the internal combustion engine 1, the temperature of the NSR catalyst, etc., as mentioned above.

After the execution of the above-mentioned processing of step S201, the routine of the ECU 6 goes to the processing of step S202, where a predetermined value Prenh3 is calculated. As described above, the "predetermined value Prenh3" referred to herein is a value which is obtained by subtracting from the above-mentioned predetermined upper limit value an amount of ammonia (an amount of $NH_3$ production) produced in the NSR catalyst in the first catalyst casing 4, in the case of assuming that the inducement-processing has been carried out, and which is calculated by using a map or a function expression, which includes, as an argument, the storage amount of NOx in the NSR catalyst. As the storage amount of NOx in that case, there is used the storage amount of NOx Stnox obtained in the above-mentioned processing of step S201.

After carrying out the above-mentioned processing of step S202, the routine of the ECU 6 goes to the processing of step S203, where it is determined whether the amount of $NH_3$ adsorption Adnh3 obtained in the above-mentioned processing of step S201 is equal to or less than the predetermined value Prenh3 obtained in the above-mentioned processing of step S202. In cases where a positive determination is made in the processing of step S203, the ECU 6 carries out the processings of steps S105 through S115. Here, note that in this embodiment, it is not necessary to inhibit the addition of ammonia by the addition device 50, and so, the processing of step S110 is carried out after the processing of step S109 has been carried out. In addition, the amount of hydrogen produced by the NSR catalyst in the first catalyst casing 4 at the time of the execution of the inducement-processing changes according to the air fuel ratio of the exhaust gas flowing into the first catalyst casing 4. For example, in the case where the air fuel ratio of the exhaust gas flowing into the first catalyst casing 4 is low, the amount of hydrogen produced by the NSR catalyst becomes larger, in comparison with the case where it is high. Accordingly, in order to produce a sufficient amount of hydrogen in the NSR catalyst of the first catalyst casing 4, it is desirable to make as low as possible the air fuel ratio of the exhaust gas flowing into the first catalyst casing 4. However, when the air fuel ratio of the exhaust gas flowing into the first catalyst casing 4 is made excessively low, the amount of hydrogen production is easy to change to a large extent with a small change of the air fuel ratio. Accordingly, the air fuel ratio of the exhaust gas flowing into the first catalyst casing 4 at the time of the execution of the inducement-processing is set to an appropriate value (e.g., about 12) in a range in which the amount of hydrogen produced by the NSR catalyst becomes sufficiently large and in which a change in the amount of hydrogen production with respect to a change in the air fuel ratio becomes small, in consideration of the specific fuel consumption of the internal combustion engine 1, etc.

In addition, in cases where a negative determination is made in the above-mentioned processing of step S203, the routine of the ECU 6 goes to the processing of step S204. In the processing of step S204, the ECU 6 estimates (calculates) an amount of residual $NH_3$ Renh3 at the end time point of the $NH_3$-consuming-processing in the case of assuming that the $NH_3$-consuming-processing has been carried out. Specifically, the ECU 6 calculates the amount of $NH_3$ consumption in the case of assuming that an amount of NOx corresponding to the storage amount of NOx in the NSR catalyst obtained in the above-mentioned processing of step S201 is reduced by the SCR catalyst, and estimates the amount of residual $NH_3$ Renh3 by subtracting the amount of $NH_3$ consumption thus calculated from the amount of $NH_3$ adsorption $Adnh_3$. In this manner, by carrying out the processing of step S203 by means of the ECU 6, an "estimation unit" according to the present invention is achieved.

Subsequently, the ECU 6 goes to the processing of step S205, where it is determined whether the amount of residual $NH_3$ Renh3 calculated in the above-mentioned processing of step S204 is equal to or less than a predetermined value (a predetermined upper limit value Thrnh3). In cases where a negative determination is made in the above-mentioned processing of step S205, the ECU 6 ends the execution of this processing routine. In that case, the $NH_3$-consuming-processing, the inducement-processing, and the diagnosis processing of the SCR catalyst are not carried out, so it is possible to suppress the occurrence of erroneous diagnosis resulting from the amount of $NH_3$ adsorption. On the other hand, in cases where an affirmative determination is made in the above-mentioned processing of step S205, the routine of the ECU 6 goes to the processing of step S206, where the $NH_3$-consuming-processing is started. Specifically, the ECU 6 changes the air fuel ratio of the mixture to be combusted in the internal combustion engine 1 from the lean air fuel ratio into the stoichiometric air fuel ratio. In that case, the air fuel ratio of the exhaust gas flowing into the NSR catalyst in the first catalyst casing 4 changes from the lean air fuel ratio to stoichiometric air fuel ratio, so that the NOx stored in the NSR catalyst desorbs from the NSR catalyst. Then, the NOx desorbed from the NSR catalyst flows into the SCR catalyst in the second catalyst casing 5, without being reduced by the NSR catalyst, so that the ammonia adsorbed to the SCR catalyst is consumed by the reduction of the NOx.

In the processing of step S207, the ECU 6 determines whether the desorption of NOx from the NSR catalyst has ended. Specifically, when the measured value of the NOx sensor 13 is equal to or less than a target value set in advance, the ECU 6 makes a determination that the desorption of NOx has ended, and when the measured value of the NOx sensor 13 is larger than the target value, the ECU 6 makes a determination that the desorption of NOx has not ended. The target value referred to herein is a value corresponding a measured value of the NOx sensor 13 at the time when the amount of NOx desorbed from the NSR catalyst becomes substantially zero. In cases where a negative determination is made in the processing of step S207, the ECU 6 carries out the processing of step S207 in a repeated manner. On the other hand, in cases where an affirmative determination is made in the processing of step S207, the ECU 6 ends the $NH_3$-consuming-processing in the processing of step S208, and subsequently, starts inducement-processing in the processing of step S105. In other words, the ECU 6 ends the $NH_3$-consuming-processing, and at the same time, starts the inducement-processing, by changing the air fuel ratio of the mixture to be combusted in the internal combustion engine 1 from the stoichiometric air fuel ratio to a rich air fuel ratio.

In cases where the deterioration of the SCR catalyst is diagnosed according to the procedure described above, in the construction in which the NSR catalyst is disposed at the upstream side of the SCR catalyst, too, it becomes possible to carry out the inducement-processing at the time when the amount of $NH_3$ adsorption in the SCR catalyst is small to such an extent as not to affect diagnostic accuracy. As a result, it becomes possible to diagnose the deterioration state of the SCR catalyst in an accurate manner.

Here, note that in the processing routine of FIG. 9, there is shown an example in which the $NH_3$-consuming-processing is carried out until the desorption of NOx from the NSR catalyst ends (the storage amount of NOx in the NSR catalyst becomes substantially zero), but the $NH_3$-consuming-processing may be ended before the end of the desorption of NOx from the NSR catalyst. For example, in cases where the storage amount of NOx in the NSR catalyst is sufficiently large with respect to the amount of $NH_3$ adsorption in the SCR catalyst, there is a possibility that the above-mentioned amount of $NH_3$ consumption (the amount of ammonia to be consumed in the case of assuming that an amount of NOx corresponding to the storage amount of NOx in the NSR catalyst is reduced by the SCR catalyst) may become larger than the amount of $NH_3$ adsorption in the SCR catalyst. Accordingly, in cases where the amount of $NH_3$ consumption becomes more than the amount of $NH_3$ adsorption, the $NH_3$-consuming-processing may be ended at the time when the amount of $NH_3$ adsorption becomes zero, or when the amount of $NH_3$ adsorption becomes equal to or less than the above-mentioned predetermined value. Specifically, at the time of the execution of the $NH_3$-consuming-processing, the amount of NOX flowing into the SCR catalyst per unit time is calculated based on the measured value of the NOx sensor 13 and the flow rate of the exhaust gas, and the processing of subtracting from the amount of $NH_3$ adsorption an amount of ammonia required for reducing the amount of NOx thus calculated is carried out in a repeated manner, whereby the $NH_3$-consuming-processing may be ended at the point in time when the amount of $NH_3$ adsorption becomes zero or equal to or less than a set value which is larger than zero.

Third Embodiment

Now, reference will be made to a third embodiment of a deterioration diagnosis apparatus for an exhaust gas purification apparatus according to the present invention based on FIG. 10 through FIG. 12. Here, a construction different from that of the above-mentioned second embodiment will be described, and an explanation of the same construction will be omitted. FIG. 10 is a view showing the schematic construction of an exhaust system of an internal combustion engine in this third embodiment of the present invention. In FIG. 10, the same symbols are attached to the same components as those in FIG. 6 in the above-mentioned second embodiment. The difference between the above-mentioned FIG. 6 and FIG. 10 is that a pre-stage casing 14 having a three-way catalyst received therein is disposed in the exhaust pipe 3 at the upstream side of the first catalyst casing 4.

The pre-stage casing 14 receives a honeycomb structured body covered with a coat layer such as alumina, a precious metal (platinum (Pt), palladium (Pd), etc.) supported by the coat layer, and a promotor or co-catalyst such as ceria ($CeO_2$) supported by the coat layer. In addition, a third air fuel ratio sensor 15, which serves to output an electrical signal correlated with an air fuel ratio of exhaust gas flowing out from the pre-stage casing 14, is mounted on the exhaust pipe 3 at a location between the pre-stage casing 14 and the first catalyst casing 4. The output signal of the third air fuel ratio sensor 15 is configured to be inputted to the ECU 6.

In such an arrangement, the ECU 6 carries out processing ($O_2$-desorption-processing) for desorbing the oxygen stored in the three-way catalyst of the pre-stage casing 14 from the three-way catalyst, before carrying out the above-mentioned inducement-processing. The $O_2$-desorption-processing is to make the air fuel ratio of the exhaust gas flowing into the pre-stage casing 14 to be a rich air fuel ratio, by adjusting the air fuel ratio of a mixture to be combusted in the internal combustion engine 1 to a rich air fuel ratio. When such $O_2$-desorption-processing is carried out, the oxygen stored in the three-way catalyst desorbs from the three-way catalyst. During the time oxygen is desorbing from the three-way catalyst, the air fuel ratio of the exhaust gas flowing out from the three-way catalyst becomes the stoichiometric air fuel ratio, so that the measured value of the third air fuel ratio sensor 15 also accordingly exhibits the stoichiometric air fuel ratio. Then, when the oxygen stored in the three-way catalyst has fully desorbed, the air fuel ratio of the exhaust gas flowing out from the three-way catalyst decreases from the stoichiometric air fuel ratio to a rich air fuel ratio, so that the measured value of the third air fuel ratio sensor 15 also accordingly changes from the stoichiometric air fuel ratio to the rich air fuel ratio. Accordingly, the $O_2$-desorption-processing should only be ended at the time when the measured value of the third air fuel ratio sensor 15 has changed from the stoichiometric air fuel ratio to the rich air fuel ratio.

However, as described in the above-mentioned second embodiment, in the case where it is necessary to carry out the $NH_3$-consuming-processing before the execution of the inducement-processing, when the $O_2$-desorption-processing is carried out before the execution of the $NH_3$-consuming-processing, the air fuel ratio of the exhaust gas flowing out from the three-way catalyst changes to a rich air fuel ratio due to the end of the desorption of oxygen from the three-way catalyst, whereby NOx may be reduced in the NSR catalyst of the first catalyst casing 4 to produce ammonia. Thus, when the ammonia produced in this manner flows into the SCR catalyst in the second catalyst casing 5, the amount of $NH_3$ adsorption in the SCR catalyst will increase. The amount of $NH_3$ adsorption increased in this manner is decreased by the $NH_3$-consuming-processing being carried out after the execution of the $O_2$-desorption-processing, and hence, in cases where the amount of NOx to desorb from the NSR catalyst is relatively large or the amount of $NH_3$ adsorption in the SCR catalyst is relatively small at the time of the execution of the $NH_3$-consuming-processing, the amount of $NH_3$ adsorption at the end time point of the $NH_3$-consuming-processing (i.e., at the time of the start of the inducement-processing) will become equal to or less than the above-mentioned predetermined upper limit value. However, in cases where the amount of NOx to desorb from the NSR catalyst is relatively small or the amount of $NH_3$ adsorption in the SCR catalyst is relatively large at the time of the execution of the $NH_3$-consuming-processing, the amount of $NH_3$ adsorption at the end time point of the $NH_3$-consuming-processing (i.e., at the time of the start of the inducement-processing) may not become equal to or less than the above-mentioned predetermined upper limit value.

Accordingly, in this third embodiment, in the case where it is necessary to carry out the $NH_3$-consuming-processing before the execution of the inducement-processing, when the $O_2$-desorption-processing is carried out before the execution of the $NH_3$-consuming-processing, the $O_2$-desorption-processing is carried out after the execution of the $NH_3$-consuming-processing, and before the execution of the inducement-processing. Here, in FIG. 11, there is shown the change over time of the amount of $NH_3$ adsorption in the SCR catalyst in the case where the $NH_3$-consuming-processing, the $O_2$-desorption-processing and the inducement-processing are carried out in a sequential manner. In FIG. 11, "Eng-Out A/F", "NSR-Out A/F", "SCR-Out A/F", "NSR-Out NOx", "Storage amount of NOx", "NSR-Out $NH_3$", and "Amount of $NH_3$ adsorption" are the same parameters as those in the above-mentioned FIG. 8. "S/C-Out A/F" in FIG. 11 represents the air fuel ratio of the exhaust gas flowing out from the three-way catalyst. In addition, "S/C-Out $NH_3$" in FIG. 11 represents the $NH_3$ concentration of the exhaust gas flowing out from the three-way catalyst.

In FIG. 11, when the $NH_3$-consuming-processing is started (t9 in FIG. 11), the air fuel ratio (Eng-Out A/F) of the exhaust gas discharged from the internal combustion engine 1 changes from a lean air fuel ratio into the stoichiometric air fuel ratio. Then, when the air fuel ratio (S/C-Out A/F) of the exhaust gas flowing out from the three-way catalyst changes from a lean air fuel ratio to the stoichiometric air fuel ratio (t10 in FIG. 11), the NOx stored in the NSR catalyst desorbs from the NSR catalyst, so that the NOx concentration (NSR-Out NOx) of the exhaust gas discharged from the NSR catalyst increases, and at the same time, the storage amount of NOx in the NSR catalyst decreases. In addition, the NOx desorbed from the NSR catalyst is reduced by the SCR catalyst, so that the amount of $NH_3$ adsorption in the SCR catalyst decreases. When the desorption of NOx from the NSR catalyst ends (t11 in FIG. 11), the $O_2$-desorption-processing is carried out by changing the air fuel ratio of the mixture to be combusted in the internal combustion engine 1 from the stoichiometric air fuel ratio into a rich air fuel ratio. Here, standing the point of view of ending the $O_2$-desorption-processing for a short time, the rich air fuel ratio in the $O_2$-desorption-processing may be made lower than the rich air fuel ratio in the inducement-processing.

When the $O_2$-desorption-processing is carried out, the oxygen stored in the three-way catalyst desorbs therefrom, so the air fuel ratio (S/C-Out A/F) of the exhaust gas flowing out from the three-way catalyst is maintained at the stoichiometric air fuel ratio. Then, when the desorption of oxygen from the three-way catalyst ends (t12 in FIG. 11), the air fuel ratio (S/C-Out A/F) of the exhaust gas flowing out from the three-way catalyst decreases from the stoichiometric air fuel ratio to a rich air fuel ratio. At that time, the ammonia concentration (S/C-Out $NH_3$) of the exhaust gas flowing out from the three-way catalyst slightly increases by a small amount of ammonia being produced in the three-way catalyst. In addition, when the desorption of oxygen from the three-way catalyst has ended, the exhaust gas of a rich air fuel ratio will flow into the NSR catalyst, but because NOx has not been stored in the NSR catalyst, the amount of ammonia produced in the NSR catalyst becomes substantially zero. Accordingly, the ammonia concentration (NSR-Out $NH_3$) of the exhaust gas flowing out from the NSR catalyst becomes a concentration substantially equivalent to the ammonia concentration (S/C-Out $NH_3$) of the exhaust gas flowing out from the three-way catalyst. As a result, although the amount of $NH_3$ adsorption in the SCR catalyst increases slightly, it is avoided that the amount of $NH_3$ adsorption after thus increased exceeds the predetermined value (the predetermined upper limit value). Accordingly, in the arrangement in which the three-way catalyst is disposed at the upstream side of the NSR catalyst, too, it becomes possible to carry out the inducement-processing in a state where the amount of $NH_3$ adsorption in the SCR catalyst is equal to or less than the predetermined value (the predetermined upper limit value).

In the following, a procedure of diagnosing the deterioration of the SCR catalyst in this third embodiment will be explained along FIG. 12. FIG. 12 is a flow chart showing a processing routine which is executed by the ECU 6 at the time of making a deterioration diagnosis of the SCR catalyst. In FIG. 12, the same symbols are attached to the same processings as those in the above-mentioned processing routine of FIG. 9. Here, note that the processing routine shown in FIG. 12 is carried out under the following conditions: the NSR catalyst in the first catalyst casing 4 has been activated; the SCR catalyst in the second catalyst casing 5 has been activated; the first air fuel ratio sensor 7 and the second air fuel ratio sensor 8 are normal; the amount of intake air and the temperature of the SCR catalyst fall in predetermined ranges, respectively; the three-way catalyst in the pre-stage catalyst casing 14 has been activated; and the third air fuel ratio sensor is normal.

In the processing routine of FIG. 12, in cases where a determination is made in the processing of step S207 that the desorption of NOx from the NSR catalyst has ended, the ECU 6 carries out the processing of steps S301 and S302 before the execution of the processing of step S105.

First, in the processing of step S301, the ECU 6 changes the air fuel ratio of the mixture to be combusted in the internal combustion engine 1 from the stoichiometric air fuel ratio suitable for the $NH_3$-consuming-processing into a rich air fuel ratio suitable for the $O_2$-desorption-processing. The rich air fuel ratio suitable for the $O_2$-desorption-processing referred to herein is an air fuel ratio lower than a rich air fuel ratio suitable for the inducement-processing (i.e., a rich air fuel ratio suitable for water gas shift reaction). Thus, when the $O_2$-desorption-processing is started in this manner, the air fuel ratio of the exhaust gas flowing into the three-way catalyst of the pre-stage casing 14 changes from the stoichiometric air fuel ratio to a rich air fuel ratio, so the oxygen stored in the three-way catalyst desorbs therefrom.

Subsequently, in the processing of step S302, the ECU 6 determines whether the desorption of oxygen from the three-way catalyst has ended. Specifically, when the measured value of the third air fuel ratio sensor 15 indicates the stoichiometric air fuel ratio, the ECU 6 makes a determination that the desorption of oxygen from the three-way catalyst has not ended, whereas when the measured value of the third air fuel ratio sensor 15 indicates a rich air fuel ratio, the ECU 6 makes a determination that the desorption of oxygen from the three-way catalyst has ended. In cases where a negative determination is made in the processing of step S302, the ECU 6 carries out the processing of step S302 in a repeated manner. On the other hand, in cases where an affirmative determination is made in the processing of step S302, the routine of the ECU 6 goes to the processing of step S105, where the inducement-processing is started. In other words, the ECU 6 ends the $NH_3$-consuming-processing, and at the same time, starts the inducement-processing, by changing the air fuel ratio of the mixture to be combusted in the internal combustion engine 1 from the rich fuel ratio suitable for the $O_2$-desorption-processing into the rich air fuel ratio suitable for the inducement-processing.

In cases where the deterioration of the SCR catalyst is diagnosed according to the procedure described above, in the construction in which the three-way catalyst is disposed at the upstream side of the NSR catalyst, too, it becomes possible to carry out the inducement-processing at the time when the amount of $NH_3$ adsorption in the SCR catalyst is small to such an extent as not to affect diagnostic accuracy. As a result, it becomes possible to diagnose the deterioration state of the SCR catalyst in an accurate manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-265364, filed on Dec. 26, 2014, which is hereby incorporated by reference herein in its entirety.

What is claimed is:

1. A deterioration diagnosis apparatus for an exhaust gas purification apparatus that is equipped with a selective catalytic reduction (SCR) catalyst arranged in an exhaust passage of an internal combustion engine, which can be driven in a lean burn operation, for reducing NOx in exhaust gas by using ammonia as a reducing agent, said selective catalytic reduction catalyst acting to store oxygen in exhaust gas when air fuel ratio of the exhaust gas is a lean air fuel ratio higher than a stoichiometric air fuel ratio, but to desorb the oxygen thus stored when the air fuel ratio of the exhaust gas is a rich air fuel ratio lower than the stoichiometric air fuel ratio, comprising:

a first air fuel ratio sensor that measures a physical quantity correlated with the air fuel ratio of the exhaust gas flowing into said selective catalytic reduction catalyst;

a second air fuel ratio sensor that measures a physical quantity correlated with the air fuel ratio of the exhaust gas flowing out from said selective catalytic reduction catalyst;

an NOx storage reduction catalyst disposed at the upstream side of said selective catalytic reduction catalyst, said NOx storage reduction catalyst serving to store therein the NOx in the exhaust gas when the air fuel ratio of the exhaust gas is a lean air fuel ratio, but to desorb NOx therefrom when the air fuel ratio of the exhaust gas is equal to or less than the stoichiometric air fuel ratio; and an electronic control unit (ECU) including a processor and memory, the ECU configured to:

obtain an amount of $NH_3$ adsorption which is an amount of ammonia stored in said selective catalytic reduction catalyst;

carry out inducement-processing, which changes an air fuel ratio of a mixture to be combusted in the internal combustion engine from a lean air fuel ratio into a rich air fuel ratio suitable for a water gas shift reaction, when the air fuel ratio of the mixture to be combusted in the internal combustion engine is a lean air fuel ratio and when the amount of $NH_3$ adsorption obtained by said ECU is equal to or less than a predetermined value that is smaller than a predetermined upper limit value, said inducement-processing acting to induce the water gas shift reaction of carbon monoxide and water generated at the time when the mixture is combusted in the internal combustion engine; and carry out diagnosis processing, which is to diagnose deterioration of said selective catalytic reduction catalyst based on a difference between the physical quantity correlated with the air fuel ratio of the exhaust gas flowing into the selective catalytic reduction catalyst measured by said first air fuel ratio sensor and the physical quantity correlated with the air fuel ratio of the exhaust gas flowing out the selective catalytic reduction catalyst measured by said second air fuel ratio sensor at the time of execution of said inducement-processing.

2. The deterioration diagnosis apparatus for an exhaust gas purification apparatus according to claim 1, wherein said predetermined value is a value which is obtained by subtracting from said predetermined upper limit value an amount of $NH_3$ production which is an amount of ammonia produced in said NOx storage reduction catalyst, in the case of assuming that said inducement-processing has been carried out.

3. The deterioration diagnosis apparatus for an exhaust gas purification apparatus according to claim 1, wherein when the air fuel ratio of the mixture to be combusted in the internal combustion engine is a lean air fuel ratio, and when the amount of $NH_3$ adsorption obtained by said ECU is more than said predetermined value, said ECU is configured to carry out $NH_3$-consuming-processing which is to change the air fuel ratio of the mixture to be combusted in the internal combustion engine from a lean air fuel ratio to the stoichiometric air fuel ratio, and which is to decrease the amount of $NH_3$ adsorption in said selective catalytic reduction catalyst to an amount equal to or less than said predetermined value, by causing the NOx stored in said NOx storage reduction catalyst to desorb therefrom, and reducing the NOx thus desorbed from said NOx storage reduction catalyst by means of said selective catalytic reduction catalyst, and then carries out said inducement-processing after the execution of the $NH_3$-consuming-processing.

4. The deterioration diagnosis apparatus for an exhaust gas purification apparatus according to claim 2, wherein when the air fuel ratio of the mixture to be combusted in the internal combustion engine is a lean air fuel ratio, and when the amount of $NH_3$ adsorption obtained by said ECU is more than said predetermined value, said ECU is configured to carry out $NH_3$-consuming-processing which is to change the air fuel ratio of the mixture to be combusted in the internal combustion engine from a lean air fuel ratio to the stoichiometric air fuel ratio, and which is to decrease the amount of $NH_3$ adsorption in said selective catalytic reduction catalyst to an amount equal to or less than said predetermined value, by causing the NOx stored in said NOx storage reduction catalyst to desorb therefrom, and reducing the NOx thus desorbed from said NOx storage reduction catalyst by means of said selective catalytic reduction catalyst, and then carries out said inducement-processing after the execution of the $NH_3$-consuming-processing.

5. The deterioration diagnosis apparatus for an exhaust gas purification apparatus according to claim 3, wherein
said ECU is further configured to calculate a storage amount of NOx which is an amount of NOx stored in said NOx storage reduction catalyst; and said ECU is further configured to calculate an amount of $NH_3$ consumption which is an amount of ammonia to be consumed in the case of assuming that an amount of NOx corresponding to the storage amount of NOx calculated by said ECU is reduced by said selective catalytic reduction catalyst, and estimates an amount of residual $NH_3$ which is an amount of $NH_3$ adsorption in said selective catalytic reduction catalyst at the end time point of said $NH_3$-consuming-processing in the case of assuming that said $NH_3$-consuming-processing is carried out, by subtracting the amount of $NH_3$ consumption from the amount of $NH_3$ adsorption obtained by said ECU;

wherein when the air fuel ratio of the mixture to be combusted in the internal combustion engine is a lean air fuel ratio, and when the amount of $NH_3$ adsorption obtained by said ECU is more than said predetermined value, said ECU is configured to carry out said $NH_3$-consuming-processing, if the amount of residual $NH_3$ estimated by said ECU is equal to or less than said predetermined value.

6. The deterioration diagnosis apparatus for an exhaust gas purification apparatus according to claim 4, wherein:
the ECU is further configured to calculate a storage amount of NOx which is an amount of NOx stored in said NOx storage reduction catalyst; and the ECU is further configured to calculate an amount of $NH_3$ consumption which is an amount of ammonia to be consumed in the case of assuming that an amount of NOx corresponding to the storage amount of NOx calculated by said ECU is reduced by said selective catalytic reduction catalyst, and estimates an amount of residual $NH_3$ which is an amount of $NH_3$ adsorption in said selective catalytic reduction catalyst at the end time point of said $NH_3$-consuming-processing in the case of assuming that said $NH_3$-consuming-processing is carried out, by subtracting the amount of $NH_3$ consumption from the amount of $NH_3$ adsorption obtained by said ECU;

wherein when the air fuel ratio of the mixture to be combusted in the internal combustion engine is a lean air fuel ratio, and when the amount of $NH_3$ adsorption obtained by said ECU is more than said predetermined value, said ECU carries out said $NH_3$-consuming-processing, if the amount of residual $NH_3$ estimated by said ECU is equal to or less than said predetermined value.

7. The deterioration diagnosis apparatus for an exhaust gas purification apparatus according to claim 3, wherein said exhaust gas purification apparatus is further equipped with a three-way catalyst that is disposed at the upstream side of said NOx storage reduction catalyst, for storing oxygen in the exhaust gas when the air fuel ratio of the exhaust gas is a lean air fuel ratio, and desorbing oxygen therefrom when the air fuel ratio of the exhaust gas is a rich air fuel ratio;

said deterioration diagnosis apparatus is further provided with a third air fuel ratio sensor that measures a physical quantity correlated with an air fuel ratio of exhaust gas flowing out from said three-way catalyst; and after the execution of said $NH_3$-consuming-processing, and before the execution of said inducement-processing, said ECU is configured to carry out $O_2$-desorption-processing until the measured value of said third air fuel ratio sensor changes from the stoichiometric air fuel ratio to a rich air fuel ratio, said $O_2$-desorption-processing being to change the air fuel ratio of the mixture to be combusted in the internal combustion engine from the stoichiometric air fuel ratio into a rich air fuel ratio, and also being to desorb the oxygen stored in said three-way catalyst.

8. The deterioration diagnosis apparatus for an exhaust gas purification apparatus according to claim 4, wherein said exhaust gas purification apparatus is further equipped with a three-way catalyst that is disposed at the upstream side of said NOx storage reduction catalyst, for storing oxygen in the exhaust gas when the air fuel ratio of the exhaust gas is a lean air fuel ratio, and desorbing oxygen therefrom when the air fuel ratio of the exhaust gas is a rich air fuel ratio;

said deterioration diagnosis apparatus is further provided with a third air fuel ratio sensor that measures a physical quantity correlated with an air fuel ratio of exhaust gas flowing out from said three-way catalyst; and after the execution of said $NH_3$-consuming-processing, and before the execution of said inducement-processing, said ECU is configured to carry out $O_2$-desorption-processing until the measured value of said third air fuel ratio sensor changes from the stoichiometric air fuel ratio to a rich air fuel ratio, said $O_2$-desorption-processing being to change the air fuel ratio of the mixture to be combusted in the internal combustion engine from the stoichiometric air fuel ratio into a rich air fuel ratio, and also being to desorb the oxygen stored in said three-way catalyst.

9. The deterioration diagnosis apparatus for an exhaust gas purification apparatus according to claim 5, wherein said exhaust gas purification apparatus is further equipped with a three-way catalyst that is disposed at the upstream side of said NOx storage reduction catalyst, for storing oxygen in the exhaust gas when the air fuel ratio of the exhaust gas is a lean air fuel ratio, and desorbing oxygen therefrom when the air fuel ratio of the exhaust gas is a rich air fuel ratio;

said deterioration diagnosis apparatus is further provided with a third air fuel ratio sensor that measures a physical quantity correlated with an air fuel ratio of exhaust gas flowing out from said three-way catalyst; and after the execution of said $NH_3$-consuming-processing, and before the execution of said inducement-processing, said ECU is configured to carry out $O_2$-desorption-processing until the measured value of said third air fuel ratio sensor changes from the stoichiometric air fuel ratio to a rich air fuel ratio, said $O_2$-desorption-processing being to change the air fuel ratio of the mixture to be combusted in the internal combustion engine from the stoichiometric air fuel ratio into a rich air fuel ratio, and also being to desorb the oxygen stored in said three-way catalyst.

10. The deterioration diagnosis apparatus for an exhaust gas purification apparatus according to claim 6, wherein said exhaust gas purification apparatus is further equipped with a three-way catalyst that is disposed at the upstream side of said NOx storage reduction catalyst, for storing oxygen in the exhaust gas when the air fuel ratio of the exhaust gas is a lean air fuel ratio, and desorbing oxygen therefrom when the air fuel ratio of the exhaust gas is a rich air fuel ratio;

said deterioration diagnosis apparatus is further provided with a third air fuel ratio sensor that measures a physical quantity correlated with an air fuel ratio of exhaust gas flowing out from said three-way catalyst; and after the execution of said $NH_3$-consuming-processing, and before the execution of said inducement-processing, said ECU is configured to carry out $O_2$-desorption-processing until the measured value of said third air fuel ratio sensor changes from the stoichiometric air fuel ratio to a rich air fuel ratio, said $O_2$-desorption-processing being to change the air fuel ratio of the mixture to be combusted in the internal combustion engine from the stoichiometric air fuel ratio into a rich air fuel ratio, and also being to desorb the oxygen stored in said three-way catalyst.

\* \* \* \* \*